US009329076B2

(12) United States Patent
Meyer et al.

(10) Patent No.: US 9,329,076 B2
(45) Date of Patent: May 3, 2016

(54) PATIENT SUPPORT SYSTEMS AND METHODS OF USE

(71) Applicant: Hill-Rom Services, Inc., Batesville, IN (US)

(72) Inventors: Eric R. Meyer, Greensburg, IN (US); Darrell Borgman, Batesville, IN (US); Timothy J. Receveur, Guilford, IN (US); Gregory W. Branson, Batesville, IN (US); Sandy M. Richards, Pershing, IN (US); Howard J. Boyd, Troy, OH (US); David W. Hornbach, Brookville, IN (US); Jonathan D. Turner, Dillsboro, IN (US); Aziz A. Bhai, West Chester, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 57 days.

(21) Appl. No.: 13/828,186

(22) Filed: Mar. 14, 2013

(65) Prior Publication Data

US 2014/0123390 A1    May 8, 2014

Related U.S. Application Data

(63) Continuation-in-part of application No. 13/798,359, filed on Mar. 13, 2013.

(60) Provisional application No. 61/722,663, filed on Nov. 5, 2012, provisional application No. 61/662,711, filed on Jun. 21, 2012, provisional application No. 61/663,311, filed on Jun. 22, 2012.

(51) Int. Cl.
*A61G 7/057*    (2006.01)
*A47C 27/10*    (2006.01)

(Continued)

(52) U.S. Cl.
CPC ............ *G01G 19/445* (2013.01); *A47C 27/082* (2013.01); *A47C 27/088* (2013.01);
(Continued)

(58) Field of Classification Search
CPC ..... A61G 7/015; A61G 7/05; A61G 7/05746; A61G 7/05769; A61G 2007/0508; A61G 2203/44; A61G 7/018; A61G 7/05776; A61G 7/16; A61G 2007/0514; A61G 2007/0524; A47C 27/08; A47C 27/088; A47C 27/10; A47C 27/081; A47C 27/082
USPC ............ 5/600, 613, 615, 617, 618, 619, 624, 5/706, 710, 713, 715, 655.3
See application file for complete search history.

(56) References Cited

U.S. PATENT DOCUMENTS 1,772,310 A    8/1930 Hart
2,549,597 A *  4/1951 Harris et al. ...................... 5/711

(Continued)

FOREIGN PATENT DOCUMENTS

EP    2433605 A1    3/2012
GB     932779 A      7/1963

(Continued)

OTHER PUBLICATIONS

User Manual, Total Care Bed System and Total Care Duo 2 System, by Hill-Rom, Inc., 2008.

(Continued)

*Primary Examiner* — Nicholas Polito
*Assistant Examiner* — David R Hare
(74) *Attorney, Agent, or Firm* — Barnes & Thornburg LLP

(57) ABSTRACT

A patient support system includes a patient support apparatus and a support surface mounted on the patient support apparatus. The patient support apparatus is reconfigurable among a plurality of different configurations for supporting a patient on the support surface in a plurality of positions. The support surface is mounted on the patient support apparatus to move in response to reconfiguration of the patient support apparatus.

18 Claims, 17 Drawing Sheets

(51) Int. Cl.
*G01G 19/44* (2006.01)
*A47C 27/08* (2006.01)
*A61G 7/015* (2006.01)
*A61G 7/018* (2006.01)
*A61G 7/05* (2006.01)
*A61G 7/16* (2006.01)

(52) U.S. Cl.
CPC ............... *A47C 27/10* (2013.01); *A61G 7/015* (2013.01); *A61G 7/018* (2013.01); *A61G 7/05* (2013.01); *A61G 7/05746* (2013.01); *A61G 7/05769* (2013.01); *A61G 7/05776* (2013.01); *A61G 7/16* (2013.01); *A61G 2007/0508* (2013.01); *A61G 2007/0514* (2013.01); *A61G 2007/0524* (2013.01); *A61G 2203/44* (2013.01)

(56) References Cited

U.S. PATENT DOCUMENTS

| | | | |
|---|---|---|---|
| 3,340,550 A | 9/1967 | Hopkins | |
| 3,340,551 A | 9/1967 | Hopkins | |
| 3,354,476 A | 11/1967 | Scales | |
| 3,428,973 A | 2/1969 | Hargest | |
| 3,434,165 A | 3/1969 | Keane | |
| 3,492,988 A | 2/1970 | Mare | |
| 3,644,950 A | 2/1972 | Lindsay | |
| 3,674,019 A | 7/1972 | Grant | |
| 3,757,366 A | 9/1973 | Sacher | |
| 3,778,851 A | 12/1973 | Howorth | |
| 3,822,425 A | 7/1974 | Scales | |
| 3,867,732 A | 2/1975 | Morrell | |
| 4,127,906 A | 12/1978 | Zur | |
| 4,193,149 A | 3/1980 | Welch | |
| 4,224,706 A | 9/1980 | Young | |
| 4,347,633 A | 9/1982 | Gammons | |
| 4,357,722 A | 11/1982 | Thompson | |
| 4,391,009 A | 7/1983 | Schild | |
| 4,394,784 A | 7/1983 | Swenson | |
| 4,411,035 A | 10/1983 | Fenwick | |
| 4,435,864 A | 3/1984 | Callaway | |
| 4,483,030 A | 11/1984 | Flick | |
| 4,525,409 A | 6/1985 | Elesh | |
| 4,525,885 A | 7/1985 | Hunt | |
| 4,628,557 A | 12/1986 | Murphy | |
| 4,638,519 A | 1/1987 | Hess | |
| 4,803,744 A | 2/1989 | Peck | |
| 4,862,529 A | 9/1989 | Peck | |
| 4,897,890 A | 2/1990 | Walker | |
| 4,944,060 A | 7/1990 | Peery | |
| 4,951,335 A | 8/1990 | Eady | |
| 4,970,743 A | 11/1990 | Wride | |
| 4,977,633 A | 12/1990 | Chaffee | |
| 4,982,466 A | 1/1991 | Higgins | |
| 4,986,738 A | 1/1991 | Kawasaki | |
| 4,991,244 A | 2/1991 | Walker | |
| 4,993,920 A | 2/1991 | Harkleroad | |
| 4,999,867 A | 3/1991 | Toivio | |
| 5,003,654 A | 4/1991 | Vrzalik | |
| 5,005,240 A | 4/1991 | Vrzalik | |
| 5,007,123 A | 4/1991 | Salyards | |
| 5,010,608 A | 4/1991 | Barnett | |
| 5,018,786 A | 5/1991 | Goldstein | |
| 5,022,110 A | 6/1991 | Stroh | |
| 5,023,967 A | 6/1991 | Ferrand | |
| 5,044,029 A | 9/1991 | Vrzalik | |
| 5,044,364 A | 9/1991 | Crowther | |
| 5,052,068 A | 10/1991 | Graebe | |
| 5,060,174 A | 10/1991 | Gross | |
| 5,062,169 A | 11/1991 | Kennedy | |
| 5,068,933 A | 12/1991 | Sexton | |
| 5,083,335 A | 1/1992 | Krouskop | |
| 5,095,568 A | 3/1992 | Thomas | |
| 5,103,519 A | 4/1992 | Hasty | |
| 5,129,117 A | 7/1992 | Celestina | |
| 5,142,719 A | 9/1992 | Vrzalik | |
| 5,152,021 A | 10/1992 | Vrzalik | |
| 5,157,800 A | 10/1992 | Borders | |
| 5,170,364 A | 12/1992 | Gross | |
| 5,179,742 A | 1/1993 | Oberle | |
| 5,216,768 A | 6/1993 | Bodine | |
| 5,251,349 A | 10/1993 | Thomas | |
| 5,267,364 A * | 12/1993 | Volk .................. 5/713 |
| 5,269,030 A | 12/1993 | Pahno | |
| 5,279,010 A | 1/1994 | Ferrand | |
| 5,325,551 A | 7/1994 | Tappel | |
| 5,331,698 A | 7/1994 | Newkirk | |
| 5,335,384 A | 8/1994 | Foster | |
| 5,367,728 A | 11/1994 | Chang | |
| 5,370,439 A | 12/1994 | Lowe | |
| 5,375,273 A | 12/1994 | Bodine | |
| 5,438,721 A | 8/1995 | Pahno | |
| 5,454,126 A | 10/1995 | Foster | |
| 5,479,666 A | 1/1996 | Foster | |
| 5,483,709 A | 1/1996 | Foster | |
| 5,487,196 A | 1/1996 | Wilkinson | |
| 5,493,742 A | 2/1996 | Klearman | |
| 5,509,155 A | 4/1996 | Zigarac | |
| 5,513,406 A | 5/1996 | Foster | |
| 5,539,943 A | 7/1996 | Romano | |
| 5,542,136 A | 8/1996 | Tappel | |
| 5,560,057 A | 10/1996 | Madsen | |
| 5,566,409 A * | 10/1996 | Klearman .......... 5/723 |
| 5,586,346 A | 12/1996 | Stacy | |
| 5,603,133 A | 2/1997 | Vrzalik | |
| 5,606,754 A | 3/1997 | Hand | |
| 5,611,096 A | 3/1997 | Bartlett | |
| 5,630,238 A | 5/1997 | Weismiller | |
| 5,647,079 A * | 7/1997 | Hakamiun et al. ........ 5/713 |
| 5,664,270 A | 9/1997 | Bell | |
| 5,666,681 A | 9/1997 | Meyer | |
| 5,687,438 A | 11/1997 | Biggie | |
| 5,699,570 A | 12/1997 | Wilkinson | |
| 5,715,548 A | 2/1998 | Weismiller | |
| 5,729,853 A | 3/1998 | Thompson | |
| 5,755,000 A | 5/1998 | Thompson | |
| 5,781,949 A | 7/1998 | Weismiller | |
| 5,787,534 A | 8/1998 | Hargest | |
| 5,815,864 A | 10/1998 | Sloop | |
| 5,870,785 A | 2/1999 | Hoorens | |
| 5,882,349 A | 3/1999 | Wilkerson | |
| 5,887,304 A | 3/1999 | von de Heyde | |
| 5,894,966 A * | 4/1999 | Bobey et al. ............ 222/500 |
| 5,904,172 A | 5/1999 | Gifft | |
| 5,926,883 A * | 7/1999 | Rechin et al. ............ 5/706 |
| 5,926,884 A | 7/1999 | Biggie | |
| 5,983,429 A | 11/1999 | Stacy | |
| 6,012,186 A | 1/2000 | Soltani | |
| 6,021,533 A | 2/2000 | Ellis | |
| 6,047,424 A | 4/2000 | Osborne | |
| 6,062,215 A | 5/2000 | Leininger | |
| 6,073,291 A | 6/2000 | Davis | |
| 6,079,090 A | 6/2000 | Ongaro | |
| 6,085,372 A | 7/2000 | James | |
| 6,115,860 A | 9/2000 | Vrzalik | |
| 6,119,291 A | 9/2000 | Osborne | |
| 6,134,732 A * | 10/2000 | Chapman et al. ........ 5/710 |
| 6,145,142 A | 11/2000 | Rechin | |
| 6,148,461 A | 11/2000 | Cook | |
| 6,163,903 A | 12/2000 | Weismiller | |
| 6,282,737 B1 | 9/2001 | Vrzalik | |
| 6,295,675 B1 * | 10/2001 | Ellis et al. ............. 5/710 |
| 6,339,410 B1 | 1/2002 | Milner | |
| 6,421,859 B1 | 7/2002 | Hicks | |
| 6,499,167 B1 | 12/2002 | Ellis | |
| 6,536,056 B1 | 3/2003 | Woehr | |
| 6,584,628 B1 | 7/2003 | Smith | |
| 6,698,046 B1 | 3/2004 | Wu | |
| 6,708,352 B2 | 3/2004 | Salvatini | |
| 6,730,115 B1 | 5/2004 | Heaton | |
| 6,735,799 B1 | 5/2004 | Ellis | |
| 6,745,996 B1 | 6/2004 | Guthrie | |
| 6,782,574 B2 | 8/2004 | Totton | |
| 6,855,158 B2 | 2/2005 | Stolpmann | |

(56) References Cited

U.S. PATENT DOCUMENTS

| | | |
|---|---|---|
| 6,892,405 B1 | 5/2005 | Dimitriu |
| 6,942,687 B1 | 9/2005 | Heaton |
| 6,953,439 B1 | 10/2005 | Kabemba |
| 7,007,330 B2 * | 3/2006 | Kuiper et al. .................... 5/715 |
| 7,036,171 B2 | 5/2006 | Wu |
| 7,086,107 B2 | 8/2006 | Ellis |
| 7,171,711 B2 | 2/2007 | Gowda |
| 7,216,389 B2 | 5/2007 | Ellis |
| 7,260,860 B2 * | 8/2007 | Chambers et al. ............... 5/713 |
| 7,296,315 B2 | 11/2007 | Totton |
| 7,441,290 B1 | 10/2008 | Flick |
| 7,610,637 B2 * | 11/2009 | Menkedick et al. ............. 5/611 |
| 7,861,334 B2 | 1/2011 | Lemire |
| 7,926,131 B2 | 4/2011 | Menkedick |
| 8,474,074 B2 | 7/2013 | O'Keefe |
| 8,555,438 B2 | 10/2013 | Turner et al. |
| 2001/0033925 A1 | 10/2001 | Trapp |
| 2002/0152551 A1 * | 10/2002 | Perez et al. ...................... 5/600 |
| 2003/0093860 A1 * | 5/2003 | Kramer et al. ................... 5/600 |
| 2006/0019581 A1 | 1/2006 | Zhang |
| 2006/0026765 A1 * | 2/2006 | Hornbach et al. ............... 5/618 |
| 2006/0101581 A1 | 5/2006 | Blanchard |
| 2007/0050910 A1 | 3/2007 | Blanchard |
| 2007/0157385 A1 | 7/2007 | Lemire |
| 2007/0163043 A1 | 7/2007 | Lemire |
| 2007/0169268 A1 | 7/2007 | Lemire |
| 2007/0174965 A1 | 8/2007 | Lemire |
| 2008/0109964 A1 * | 5/2008 | Flocard et al. ................... 5/713 |
| 2011/0314609 A1 * | 12/2011 | Lee ............................... 5/655.3 |
| 2012/0005832 A1 | 1/2012 | Turner et al. |
| 2012/0079662 A1 | 4/2012 | Dzioba et al. |
| 2012/0096644 A1 * | 4/2012 | Heimbrock ...................... 5/600 |
| 2012/0124744 A1 * | 5/2012 | Hornbach et al. ............... 5/611 |
| 2012/0144588 A1 * | 6/2012 | Heimbrock et al. .............. 5/624 |

FOREIGN PATENT DOCUMENTS

| | | |
|---|---|---|
| GB | 1545806 A | 5/1979 |
| GB | 2134379 A | 5/1984 |
| JP | 2004-057601 A | 2/2004 |
| WO | WO 88/09651 A1 | 12/1988 |
| WO | 9427544 A2 | 12/1994 |
| WO | 9909865 A1 | 3/1999 |
| WO | WO 99/09865 | 3/1999 |

OTHER PUBLICATIONS

Service Manual, Total Care Bed System, by Hill-Rom, Inc., 2008.
PCT International Search Report for PCT/US2013/046796, dated Jun. 20, 2013, 5 pages.
EP partial supplementary search report for Application No. 13807132.9, dated May 20, 2015 (5 pages).
Notification of Reasons for Rejection regarding Japanese Patent Application No. 2015-518577, dated Jan. 12, 2016 (3 pages).

* cited by examiner

PATENT SUPPORT SYSTEMS AND METHODS OF USE

CROSS REFERENCE TO RELATED APPLICATIONS

The present application is a continuation-in-part of U.S. application Ser. No. 13/798,359 filed 13 Mar. 2013 and claims the benefit under 35 U.S.C. §119(e) of U.S. Provisional Application No. 61/722,663 filed 5 Nov. 2012, U.S. Provisional Application No. 61/662,711 filed 21 Jun. 2012, and U.S. Provisional Application No. 61/663,311 filed 22 Jun. 2012. U.S. Provisional Application No. 61/722,663 filed 5 Nov. 2012 is hereby incorporated by reference herein.

BACKGROUND

The present disclosure is related to patient support systems and methods of using patient support systems. Specifically, the present disclosure is related to a patient support system embodied as a hospital bed including a patient support apparatus (sometimes called a bed frame) and a support surface (sometimes called a mattress) mounted on the patient support apparatus.

Some modern hospital beds include patient support apparatuses that are reconfigurable to support a patient while laying flat or sitting up in bed. Some hospital beds include support surfaces that cushion a patient supported on the reconfigurable patient support apparatus. However, some support surfaces may be unable to properly cushion a patient when mounted on a patient support apparatus that is reconfigured via tilting, pivoting, expansion, and sliding of a multi-component deck.

SUMMARY

The present application discloses one or more of the features recited in the appended claims and/or the following features which, alone or in any combination, may comprise patentable subject matter:

According to a first aspect of the present application, a patient support system may include a patient support apparatus, a support surface, and a controller. The patient support apparatus may include a moveable deck with a seat-deck section and a head-deck section. The head-deck section may be movable relative to the seat-deck section between a first position and a second position. In the first position, the head-deck section may be adjacent the seat-deck section. In the second position, the head-deck section may be spaced apart from the seat-deck section forming a gap between the seat-deck section and the head-deck section. The support surface may be mounted on the patient support apparatus to cover the movable deck. The support surface may include a cover, a plurality of support bladders positioned in the cover, and a fill bladder positioned in the cover. The fill bladder may be arranged over the interface of the seat-deck section and the head-deck section. The controller may be coupled to the movable deck, the support bladders, and the fill bladder. The controller may be configured to inflate the fill bladder in response to movement of the head-deck section from the first position to the second position so that the fill bladder covers the gap formed between the seat-deck section and the head-deck section.

In some embodiments, the cover may include a head-end section, a foot-end section, and expandable folds coupled between the head-end section and the foot-end section. The expandable folds may be arranged over the interface of the seat-deck section and the head-deck section so that the cover extends over the gap formed between the seat-deck section and the head-deck section when the head-deck section is moved from the first position to the second position.

In some embodiments, the support surface may include a plurality of lugs coupled to a bottom side of the cover. The lugs may be configured to be received in lug-receiving apertures formed in the moveable deck when the support surface is mounted on the patient support apparatus. The lugs may include a stem and a ball, the ball spaced apart from the cover. The lug-receiving apertures may include at least one keyhole slot with a wide portion and a narrow portion.

In some embodiments, the support surface may include a trunk carrying pneumatic and electrical lines. The trunk may extend downwardly from a bottom surface of the cover to be received by the patient support apparatus when the support surface is mounted on the patient support apparatus. In some embodiments, the seat-deck section may be formed to include a channel sized to receive the trunk of the support surface when the support surface is mounted on the patient support apparatus.

In some embodiments, the movable deck may include a foot-deck section. The plurality of support bladders may include a head-support bladder arranged to extend over the head-deck section, a seat-support bladder arranged to extend over the seat-deck section, and a foot support bladder arranged to extend over the foot-deck section.

In some embodiments, the foot-support bladder may include a plurality of cells that cooperate to form a left rail section a right rail section and a central section. The central section may have a diminishing cross-sectional area to form a space under the central section defined between the left rail section, the right rail section, and the central section.

According to another aspect of the present disclosure, a patient support surface may include a cover and a cushion. The cover may have a head end, a foot end, a left side, and a right side. The cushion may be encased in the cover and may include a first foam pad and a second foam pad and arranged below the first foam pad. The second foam pad may be formed to include a plurality of perforations extending through the second foam pad.

In some embodiments, the cushion may include a third foam pad extending from the foot end of the cover toward the head end of the cover. The second foam pad may be arranged between the third foam pad and the head end of the cover. The third foam pad may be formed to include a plurality of perforations.

In some embodiments, the cushion may include a first bolster arranged to extend along a first side of the second foam pad and a second bolster arranged along a second side of the second foam pad. The first and the second bolsters may each be formed to include slits extending upwardly from a bottom side of the left and the right bolsters toward a top side of the left and the right bolsters. The first and the second bolsters may each be formed to include slits extending downwardly from the top side of the left and the right bolsters toward the bottom side of the left and the right bolsters.

In some embodiments, the cover may include a head section, a foot section, and an expandable section coupled between the head section and the foot section. The expandable section may include an elastic material arranged to extend from the left side to the right side of the cover over a portion of a bottom surface of the cover. The expandable section may include a plurality of expandable folds arranged to extend from the left side to the right side of the cover over a portion of a bottom surface of the cover.

In some embodiments, the patient support surface may include a plurality of lugs extending downwardly from the cover. Each lug may include a stem extending from the cover and a ball spaced apart from the cover.

In some embodiments, a patient support surface may include an overlay arranged to extend over a top side of the cover. The overlay may include a head portion, a foot portion, and an expandable portion. The head portion may be arranged to extend from the head end of the cover toward the foot end of the cover. The foot portion may be arranged to extend from the foot end of the cover toward the head end of the cover. The expandable portion may be coupled between the head portion and the foot portion. The expandable portion may include a plurality of expandable folds arranged to extend from a left side to a right side of the overlay over a portion of a bottom surface of the overlay.

According to another aspect of the present disclosure, a patient support system may include a patient support apparatus, a patient support surface, and a controller. The patient support apparatus may be movable from a first configuration to a second configuration. The patient support surface may be mounted on the patient support apparatus and may include a cover and a plurality of inflatable bladders encased in the cover. The controller may be configured to adjust the pressure in at least one of the inflatable bladders during movement of the patient support apparatus from the first configuration to the second configuration, to monitor the pressure in the at least one of the inflatable bladders during movement of the patient support apparatus from the first position to the second position, and to adjust the speed of movement from the first configuration to the second configuration of the patient support apparatus based on the monitored pressure.

In some embodiments, the controller may be configured to stop movement from the first configuration to the second configuration of the patient support apparatus based on the monitored pressure if the rate of change of the monitored pressure is below a threshold. The controller may be configured to trigger an alarm if the rate of change of the monitored pressure is below a threshold.

In some embodiments, the first position may be a lie-flat configuration. The second position may be a chair-egress position.

In some embodiments, the patient support system may include a plurality of sensors configured to detect pressure in the plurality of bladders and the position of the patient support apparatus. The sensors may be coupled to the controller.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 6 is a partially diagrammatic side elevation view of the deck and the support surface showing the deck of the patient support apparatus includes a head-deck section, a seat deck section, a thigh-deck section, and a foot deck section arranged in the flat position, and showing that the fill bladder included in the mattress is deflated when the deck is arranged in the flat configuration;

FIG. 7 is a view similar to FIG. 6 showing the deck moved by pivoting and sliding to a partially-inclined position in which the head deck section is spaced apart from the seat deck section forming a gap in the support bladders of the support surface and a gap between the head deck section and the seat deck section, and showing that the fill bladder is partially-inflated when the deck is moved to the partially-inclined configuration to fill the gaps;

FIG. 8 is a view similar to FIGS. 6 and 7, showing the deck moved by pivoting and sliding to a fully-inclined position in which the head deck section is further spaced apart from the seat deck section expanding the gap in the support bladders and the gap between the head deck section and the seat deck section, and showing that the fill bladder is inflated when the deck is moved to the fully-inclined configuration to fill the gap between the head deck section and the seat deck section;

FIG. 10 is a is a partially diagrammatic side elevation view of the deck and the support surface showing a seat bladder and a foot bladder of the support surface deflated prior to the patient support apparatus moving from the fully inclined configuration toward the chair-egress configuration;

FIG. 11 is a view similar to FIG. 10 showing the deck moved to a chair-egress configuration and showing that the seat bladder and the foot bladder remain deflated;

FIG. 12 is a view similar to FIGS. 10 and 11 showing a turn bladder included in the surface underlying the patient's torso inflated to help push a patient exiting the patient support system to stand up out of the patient support system;

FIG. 14 is a is a partially diagrammatic side elevation view of the deck and the support surface showing the head bladder, the seat bladder, and the foot bladder inflated to a normal inflation level prior to sequenced inflation to support a patient exiting the patient support system;

FIG. 15 is a view similar to FIG. 14 showing head bladder and the foot bladder inflated to an exit inflation level to support a patient pushing down with his hands to push himself up during exit from the patient support system as suggested in FIG. 13;

FIG. 16 is a view similar to FIGS. 14 and 15 the seat bladder inflated to an exit inflation level, after the head and foot bladder are inflated to exit inflation levels, to help push a patient exiting the patient support system to stand up out of the patient support system;

FIG. 17A is a detail view of one of the lugs shown in FIG. 17;

FIG. 17B is a detail view of one of the lug-receiving apertures shown in FIG. 17;

FIG. 17C is a detail view of another of the lug-receiving apertures shown in FIG. 17;

DETAILED DESCRIPTION OF THE DRAWINGS

Figure 1:
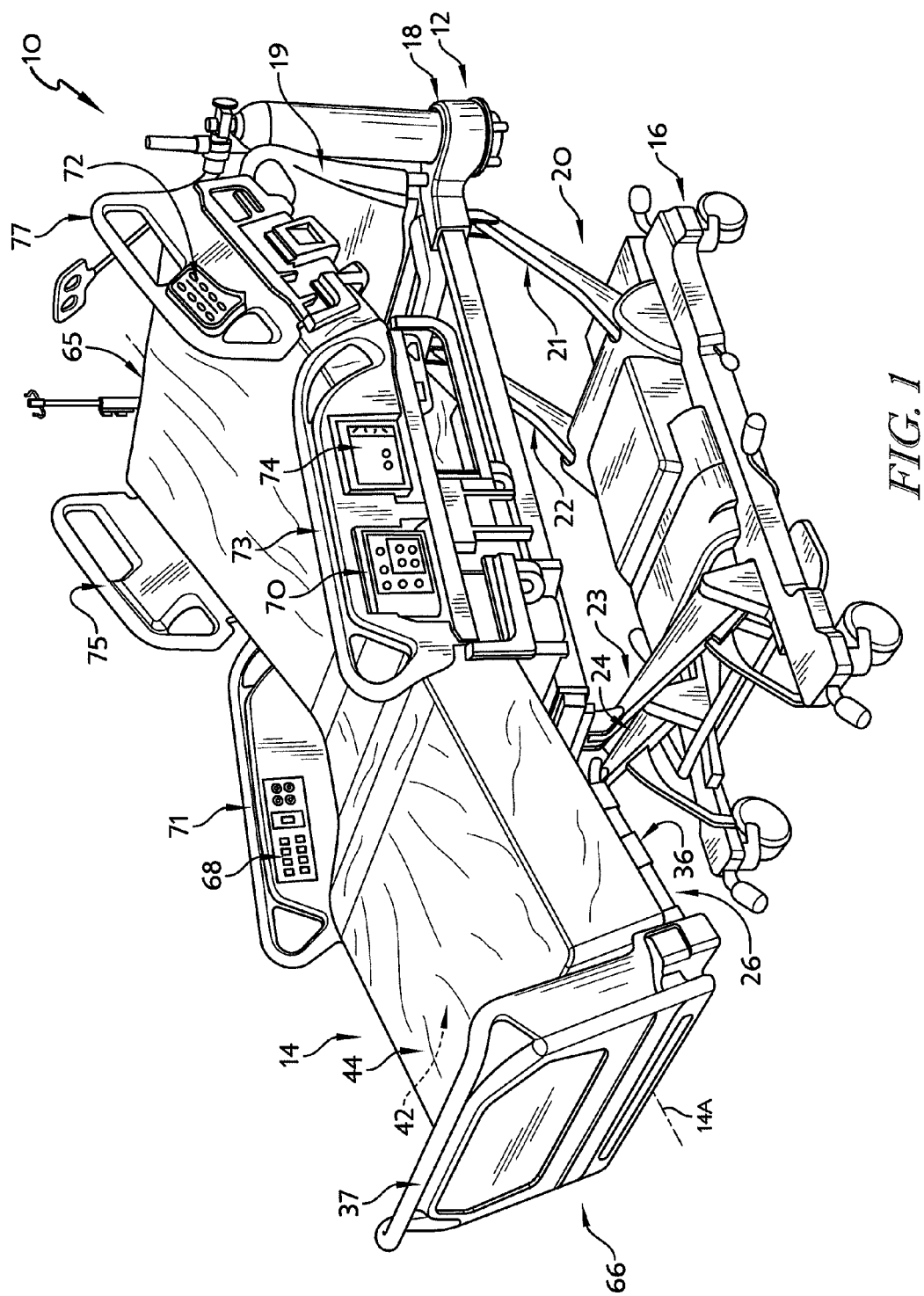
FIG. 1 is a perspective view of a patient support system including a patient support apparatus with a movable deck arranged in a partially-inclined configuration and a support surface mounted on the deck of patient support apparatus.

Referring to FIG. 1, a patient support system is embodied as a hospital bed 10 including a patient support apparatus 12 (sometimes called a bed frame), a support surface 14 (sometimes called a mattress) mounted on the patient support apparatus 12, and a control system 15 coupled to both the patient support apparatus 12 and to the support surface 14. The patient support apparatus 12 is reconfigurable to support a patient on the bed 10 in different positions. The support surface 14 is adapted for use with the patient support apparatus 12 to support the patient in each different position induced by the patient support apparatus 12 and is configured to apply therapies to the patient while supported on the bed 10. The control system 15 controls movement of the patient support apparatus 12 and operation of the support surface 14.

The patient support apparatus 12 illustratively includes a lower frame 16, an upper frame 18, and a lift system 20 coupled to the lower frame 16 and the upper frame 18, as shown in FIG. 1. The lift system 20 includes a plurality of lift arms 21, 22, 23, 24 and is configured to raise and lower the upper frame 18 relative to the lower frame 16. The lift system 20 is coupled to and controlled by the control system 15 as shown in FIG. 2.

Figure 2:
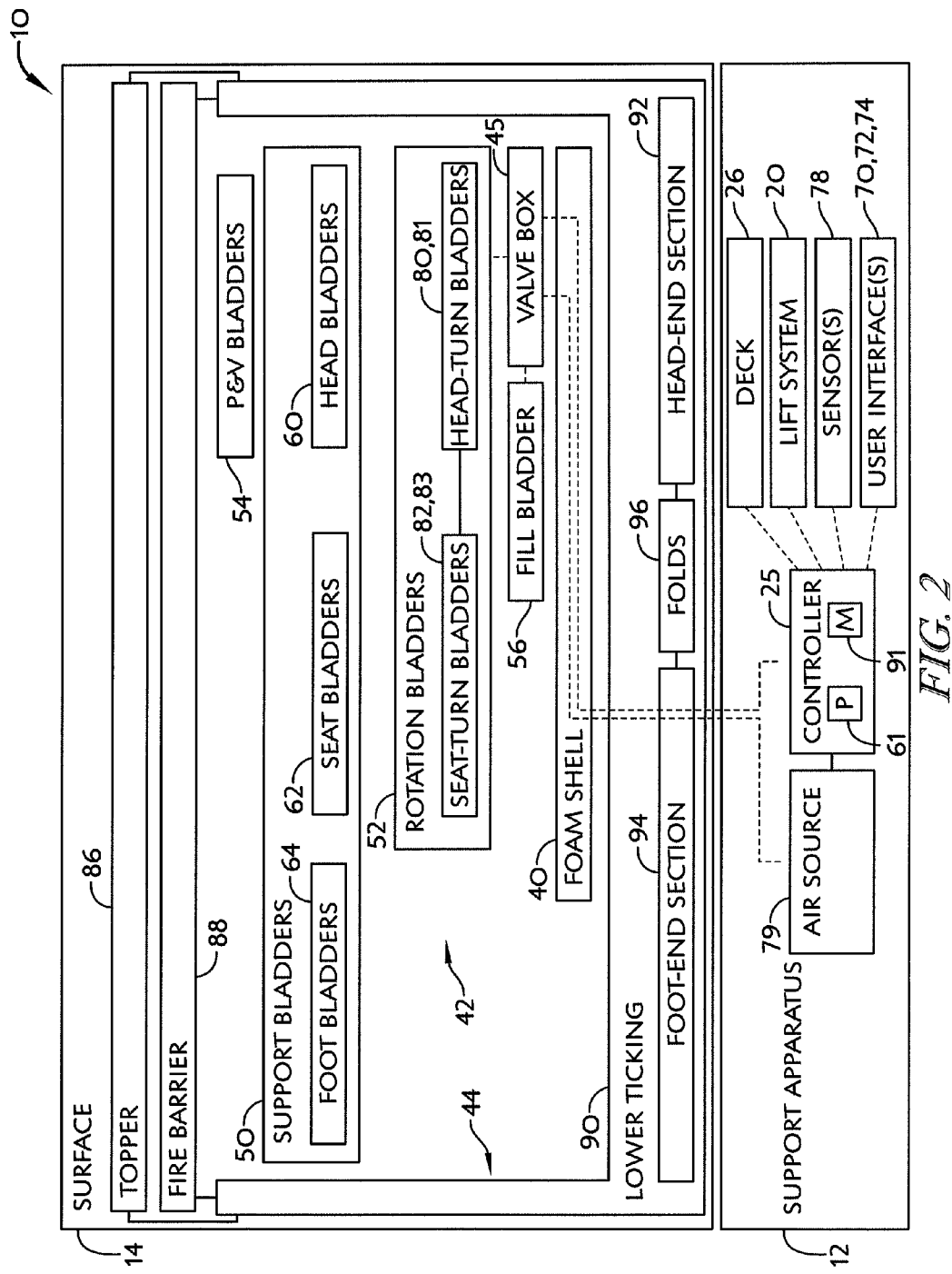
FIG. 2 is a diagrammatic view of the patient support system of FIG. 1 showing that the patient support apparatus includes an air source and a controller, and showing that the support surface includes a valve box and a plurality of bladders coupled to the valve box.

The patient support apparatus 12 also includes a deck 26 coupled to the upper frame 18 and repositionable to a plurality of positions as suggested in FIG. 1 The deck is also coupled to and controlled by the control system 15 as shown in FIG. 2.

With regard to movement of the deck 26, the head-deck section 30 is mounted to the upper frame 18 to pivot about an axis relative to the seat-deck section 32 and to slide relative to the seat-deck section 32 and the upper frame 18 as described in U.S. Publication Nos. US 2010/0122415 A1 and US 2012/0005832 A1, both incorporated by reference herein in their entirety, except as they are inconsistent with the present disclosure. The seat-deck section 32 is coupled to the upper frame 18 to move with the upper frame 18. The thigh-deck section 34 is coupled to the seat-deck section 32 to pivot relative to the seat-deck section 32. The foot-deck section 36 is coupled to the thigh-deck section 34 to pivot relative to the thigh-deck section 34. The foot-deck section 36 is also extendable and retractable to lengthen or shorten the deck 26 as desired by a caregiver or to accommodate repositioning of the deck 26.

The control system 15 illustratively includes a controller 25, a plurality of user interfaces 68, 70, 72, 74, 76, a plurality of sensors 78, and an air source 79 as shown in FIG. 2. The controller 25 illustratively includes a processor 61 and a memory 91 coupled to the processor 61 and including instructions to be executed by the processor 61. The user interfaces 68, 70, 72, 74, 76 are coupled to the controller 25 and communicate with the controller 25. The sensors 78 are also coupled to the controller 25 to communicate with the controller 25. The air source 79 is coupled to the controller 25 to communicate with the controller 25 and is configured to inflate bladders 42 included in the support surface 14.

Sensors 78 illustratively include pressure sensors, load cells, and a potentiometers positioned throughout the bed 10. In particular, the pressure sensors are configured to detect the pressure in each bladder of the support surface. The load cells are positioned between the upper frame 18 and the deck 26 and are configured to detect patient weight. The potentiometers are configured to detect the angle of the deck sections 30, 32, 34, 46 and the angle of the upper frame 18 relative to the floor underlying the bed 10.

Figure 3:
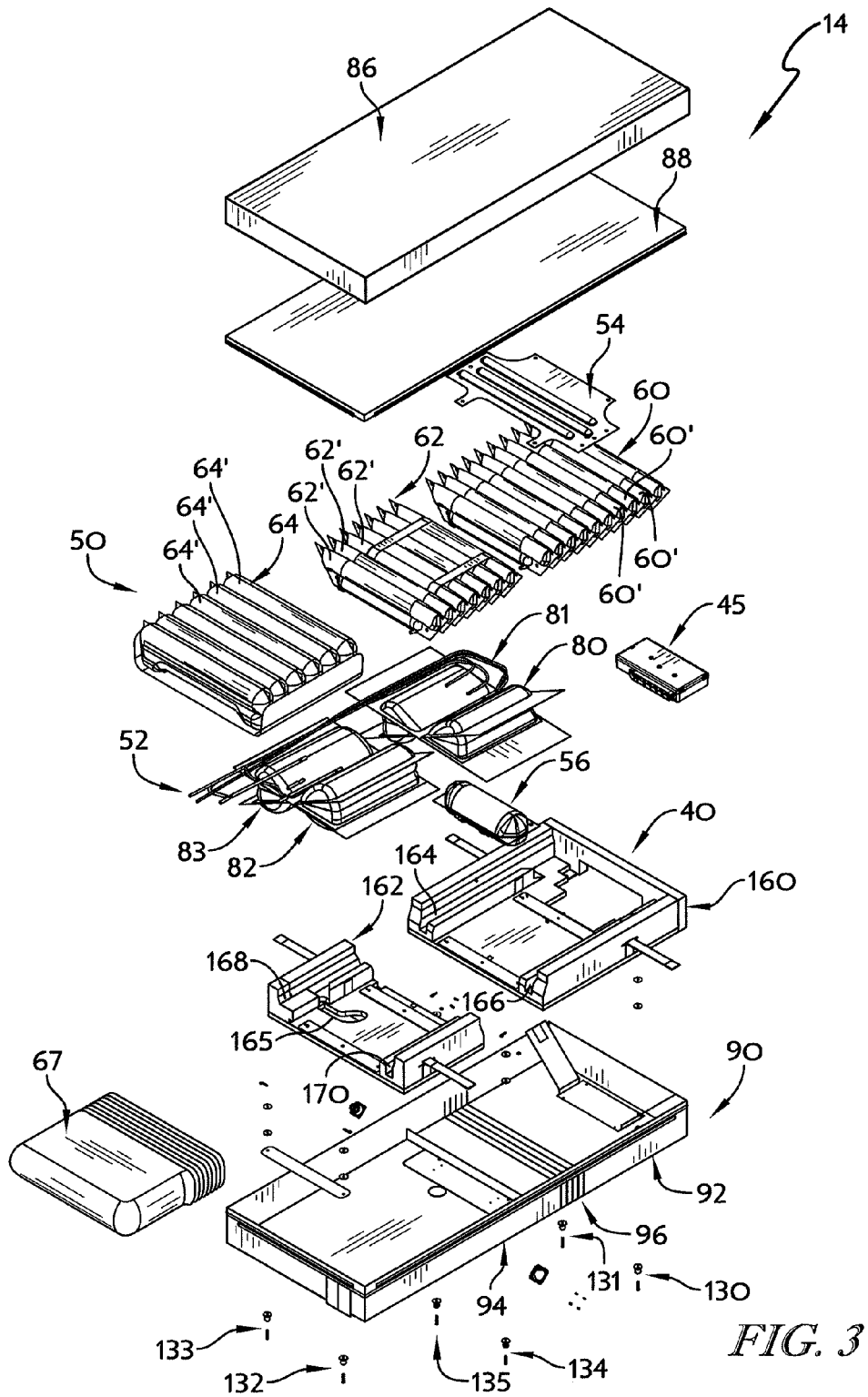
FIG. 3 is an exploded perspective view of the support surface of FIGS. 1 and 2 showing that the support surface includes (from bottom to top) a lower ticking, a foam shell, a fill bladder, lateral rotation bladders, support bladders, percussion and vibration therapy bladders, a fire barrier, and a low-air-loss topper.

The support surface 14 is coupled to the deck 26 and moves with the deck 26 as the deck 26 is repositioned. The support surface 14 illustratively includes a foam shell 40, a plurality of inflatable bladders 42 supported by the foam shell 40, and a cover 44 encasing the foam shell 40 and the bladders 42 as shown in FIGS. 2 and 3. The foam shell 40 underlies the inflatable bladders 42 and supports the bladders 42. The inflatable bladders 42 are coupled to a valve box 45 included in the support surface 14 and are configured to be inflated and deflated to support and apply therapies to a patient on the support surface 14. The cover 44 encapsulates the foam shell 40 and the bladders 42 and accommodates movement of the foam shell 40 and the inflatable bladders 42 during repositioning of the deck 26.

The inflatable bladders 42 included in the support surface 14 illustratively include support bladders 50, rotation bladders 52, percussion and vibration bladders 54, and a fill bladder 56 as shown in FIGS. 2 and 3. The support bladders 50 are configured to be inflated to support a patient lying on the support surface 14. The rotation bladders 52 are positioned below the support bladders 50 and are configured to inflate to rotate a patient on the support surface 14 about a longitudinal axis 14A of the support surface. The percussion and vibration bladders 54 are positioned above the support bladders 50 and are configured to apply percussive and/or vibratory therapies to a patient lying on the support surface 14. The fill bladder 56 is located below the support bladders 50 and is configured to fill a gap G1 formed between the support bladders 50 when the deck 26 of the patient support apparatus is repositioned as suggested in FIGS. 6-8.

The support bladders 50 include head-support bladder 60, seat-support bladder 62, and foot-support bladder 64 as shown, for example, in FIGS. 2 and 3. The head-support bladder 60 having a plurality of laterally extending inflatable cells 60' is located at a head end 65 of the support surface 14. The foot-support bladder 64 having a plurality of laterally extending inflatable cells 64' is located at a foot end 66 of the support surface 14 and is encased in a cover 67. The seat-support bladder 62 having a plurality of laterally extending inflatable cells 62' is located between the head-support bladders 60 and the foot-support bladders 64.

The rotation bladders illustratively include left and right head-turn bladders 80, 81 and seat-turn bladders 82, 83 as shown in FIGS. 2 and 3. The left and right head-turn bladders 80, 81 are arranged to lie under a patient's torso when the patient is lying on the bed 10 to turn the patient's torso along the longitudinal axis 14A depending on which head-turn bladder 80, 81 is inflated. The left and right seat-turn bladders 82, 83 are arranged to lie under a patient's seat and thighs when the patient is lying on the bed 10 to turn the patient's legs along the longitudinal axis 14A depending on which seat-turn bladder 82, 83 is inflated. In the illustrative embodiment, the left head-turn bladder 80 and the left seat-turn bladder 82 are plumbed together for concurrent inflation but in other embodiments may be separately plumbed. Similarly, in the illustrative embodiment, the right head-turn bladder 81 and the right seat-turn bladder 83 are plumbed together for concurrent inflation but in other embodiments may be separately plumbed. The left and right head-turn bladders 80, 81 are spaced apart from the left and right seat turn bladders, 83 to accommodate formation of the gap G2 when the deck 26 of the patient support apparatus is repositioned as suggested in FIGS. 6-8.

The cover 44 illustratively includes a topper 86, a fire barrier 88, and a lower ticking 90 as shown in FIGS. 2 and 3. The topper 86 is illustratively a low-air-loss topper configured to conduct air along a top side 85 of the support surface 14 to influence the temperature and humidity of a patient's skin supported on the support surface 14. The topper 86 is coupled to the lower ticking 90 by a zipper and overlies the fire barrier 88. The fire barrier 88 is coupled to the lower ticking 90 and extends over the lower ticking to encase the foam shell 40, the bladders 42, and the valve box 45 inside the cover 44.

The lower ticking 90 includes a head-end section 92, a foot-end section 94, and a series of folds 96 coupled to the head-end section 92 and the foot-end section 94 as shown in FIGS. 2 and 3. The series of folds 96 are configured to allow expansion of a bottom side 95 of the support surface 14 to accommodate formation of the gap G1 between in the support bladders 50 and the gap G2 between the deck sections 30, 32 when the deck 26 of the patient support apparatus is repositioned as suggested in FIGS. 6-8.

Figure 4:
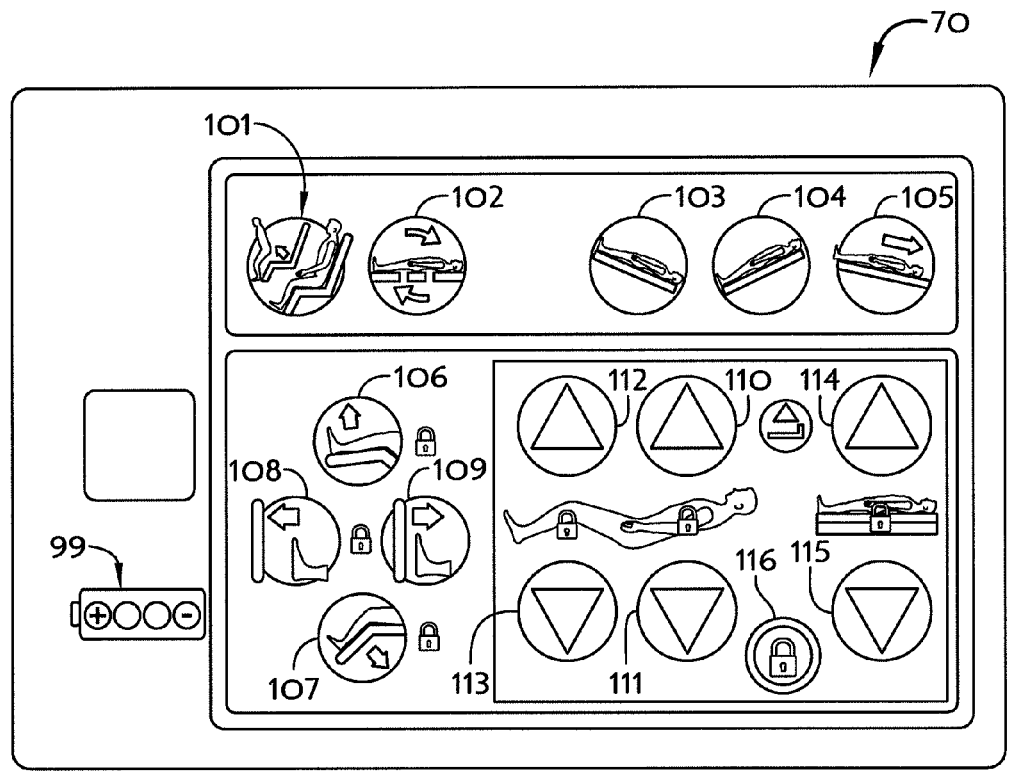
FIG. 4 is a side elevation view of a first user interface panel included in the patient support apparatus of FIG. 1.
Figure 6:
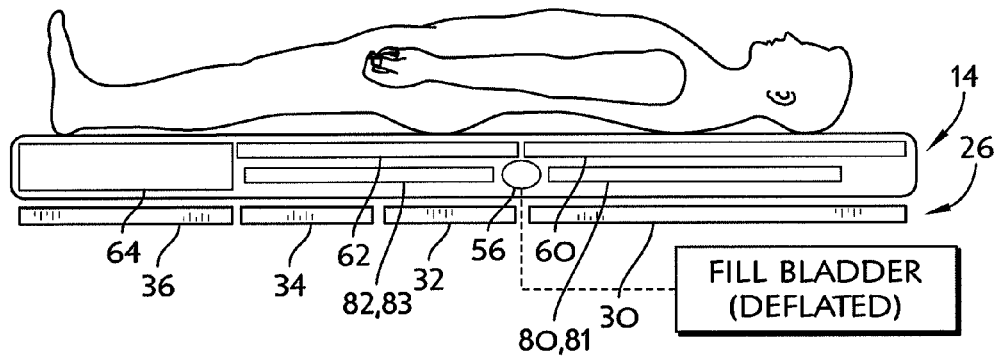
FIGS. 6-8 are a series of partially diagrammatic side elevation views of the deck and the support surface showing the deck of the patient support apparatus moving from a flat configuration, shown in FIG. 6, to a fully-inclined configuration, shown in FIG. 8, and showing that the fill bladder of the support surface is configured to inflate in response to movement of the deck to fill a gap created in the support surface and a gap formed in the deck during movement to the fully-inclined configuration.
Figure 7:
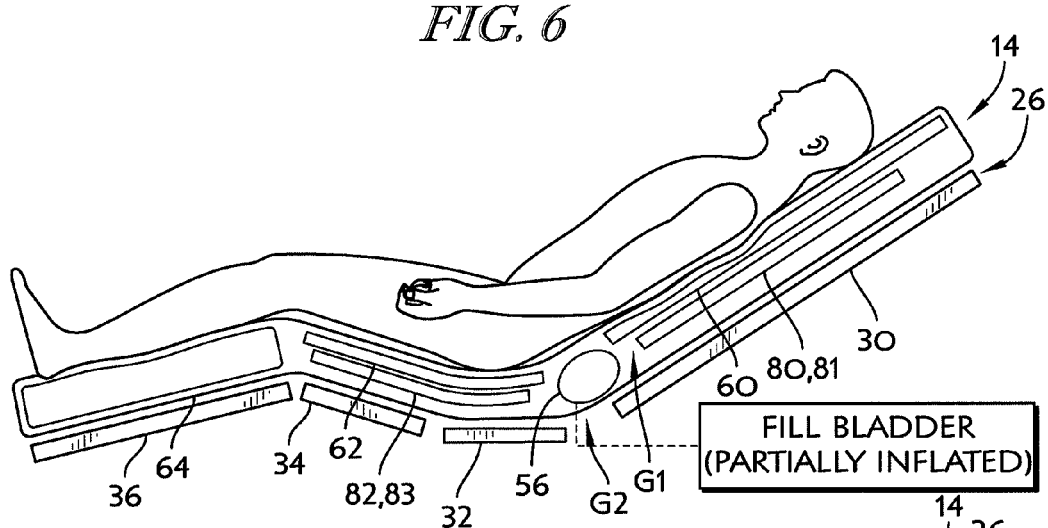
Figure 8:
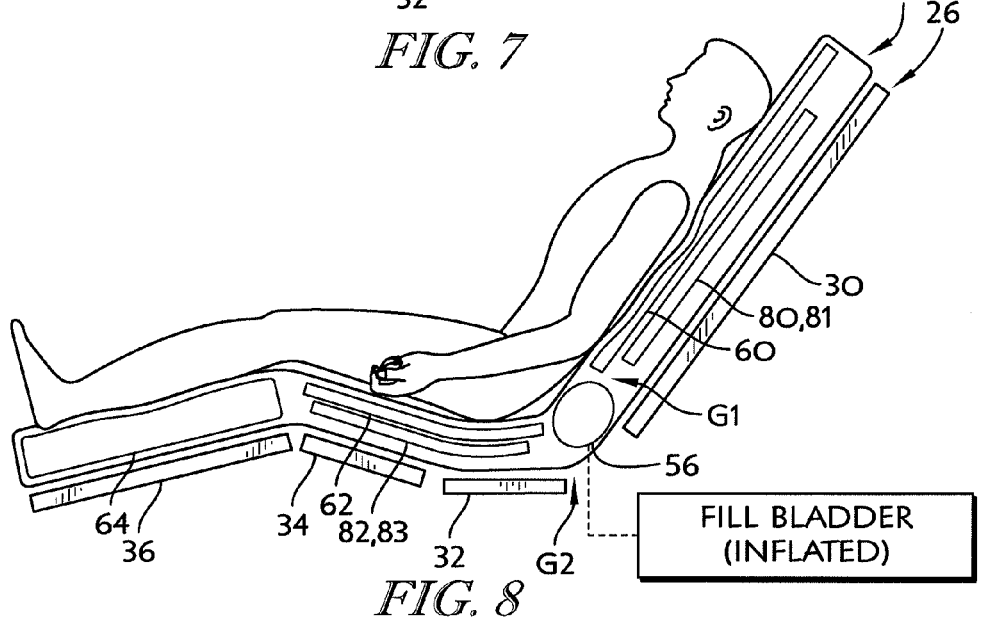
Figure 9:
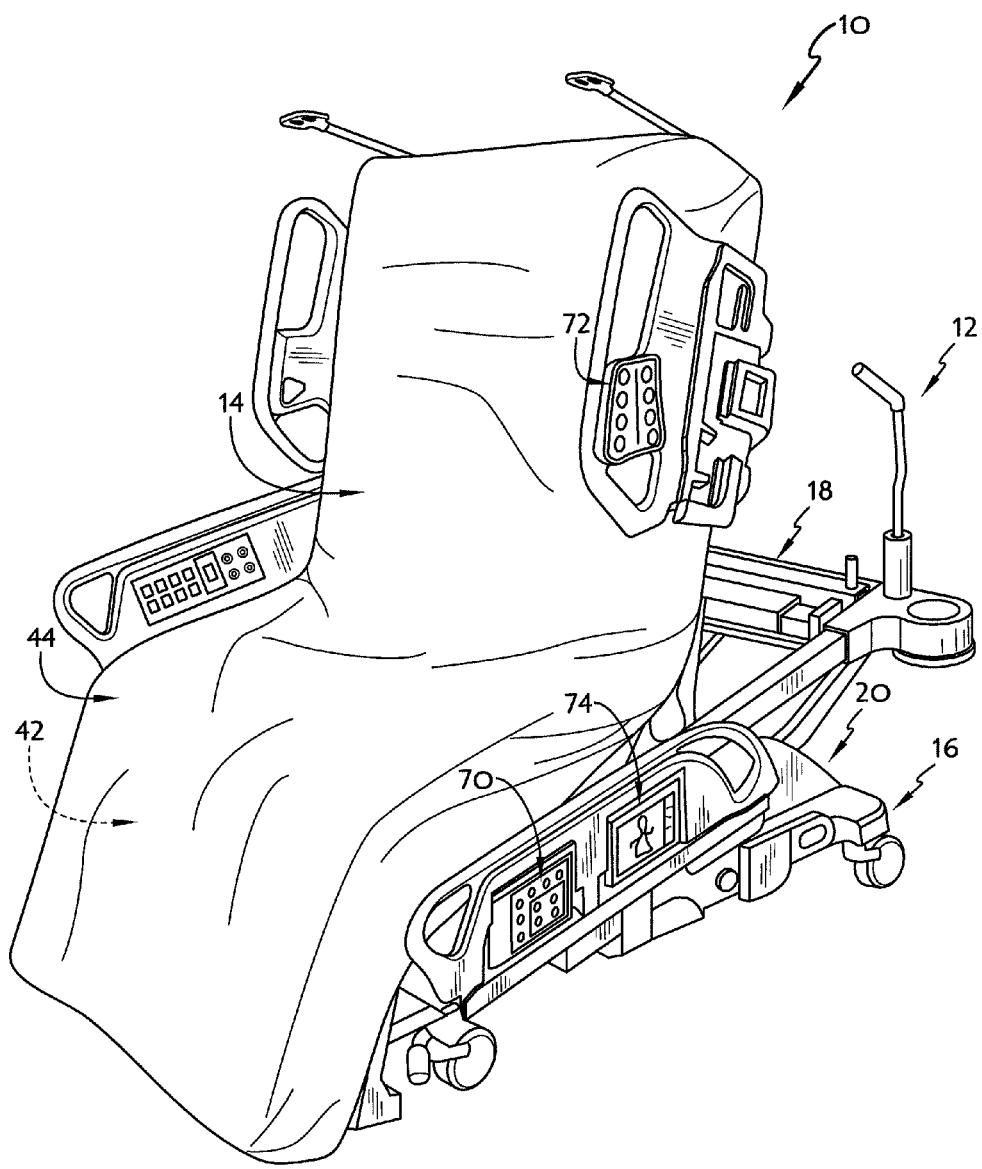
FIG. 9 is a perspective view of the patient support system moved to the chair-egress configuration in response to a caregiver pressing and holding a chair-egress button included in the first user interface panel (shown in FIG. 4) to reconfigure the patient support system for a patient exiting the patient support system.

Referring now to FIG. 4, the first user interface 70 includes a battery level indicator 99 and a plurality of buttons 101-116. Buttons 101-116 are operable by a caregiver to reconfigure the bed 10 by communicating with the controller to operate the deck 26, the lift system 20, the valve box 45, and the air supply 79. Specifically, the first user interface 70 includes the following buttons:

Chair-egress button 101 for reconfiguring the bed 10 to a chair-egress configuration as shown in FIG. 9, Return-to-flat button 102 for reconfiguring the bed 10 from a non-flat configuration (such as chair-egress) to a flat position, Trendelenberg button 103 for reconfiguring the bed 10 to a Trendelenberg configuration, Reverse-Trendelenberg button 104 for reconfiguring the bed 10 to a reverse-Trendelenberg configuration, Pull-up-in-bed button 105 for flattening the deck and raising the foot end 66 of the deck 26 above the head end 65 of the deck 26 to assist a caregiver pulling a patient up in the bed 10, Foot-raise button 106 for raising the foot-deck section 36 as suggested by the icon on the foot-raise button 106, Foot-lower button 107 for lowering the foot-deck section 34 as suggested by the icon on the foot-lower button 107, Foot-extend button 108 for extending the foot-deck section 36, Foot-retract button 109 for retracting the foot-deck section 36, Head-deck incline button 110 for increasing the incline of the head-deck section 30 by pivoting the head-deck section 30 relative to the seat-deck section 32 and sliding the head-deck section 30 relative to the seat-deck section 32 and the upper frame 18 as suggested in FIGS. 6-8, Head-deck decline button 111 for decreasing the incline of the head-deck section 30, Thigh-deck incline button 112 for increasing the incline of the thigh-deck section 34, Thigh-deck decline button 113 for decreasing the incline of the thigh-deck section 34, Upper-frame raise button 114 for lifting the upper frame 18 relative to the lower frame 16, Upper-frame lower button 115 for lowering the upper frame 18 relative to the lower frame 16, and Unlock button 116 for activating the functions of buttons 101-115 in response to holding down unlock button 116 to prevent unwanted activation of buttons 101-113.

Figure 5:
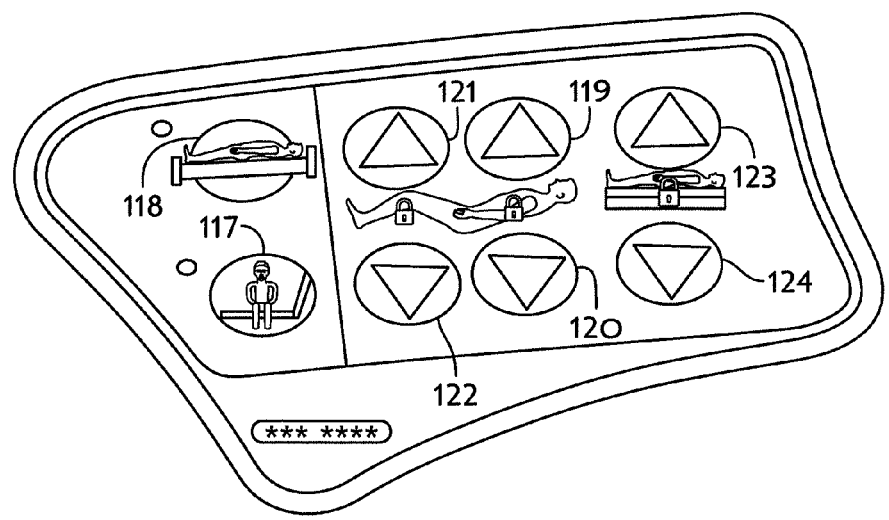
FIG. 5 is a side elevation view of a second user interface panel included in the patient support apparatus of FIG. 1.
Figure 13:
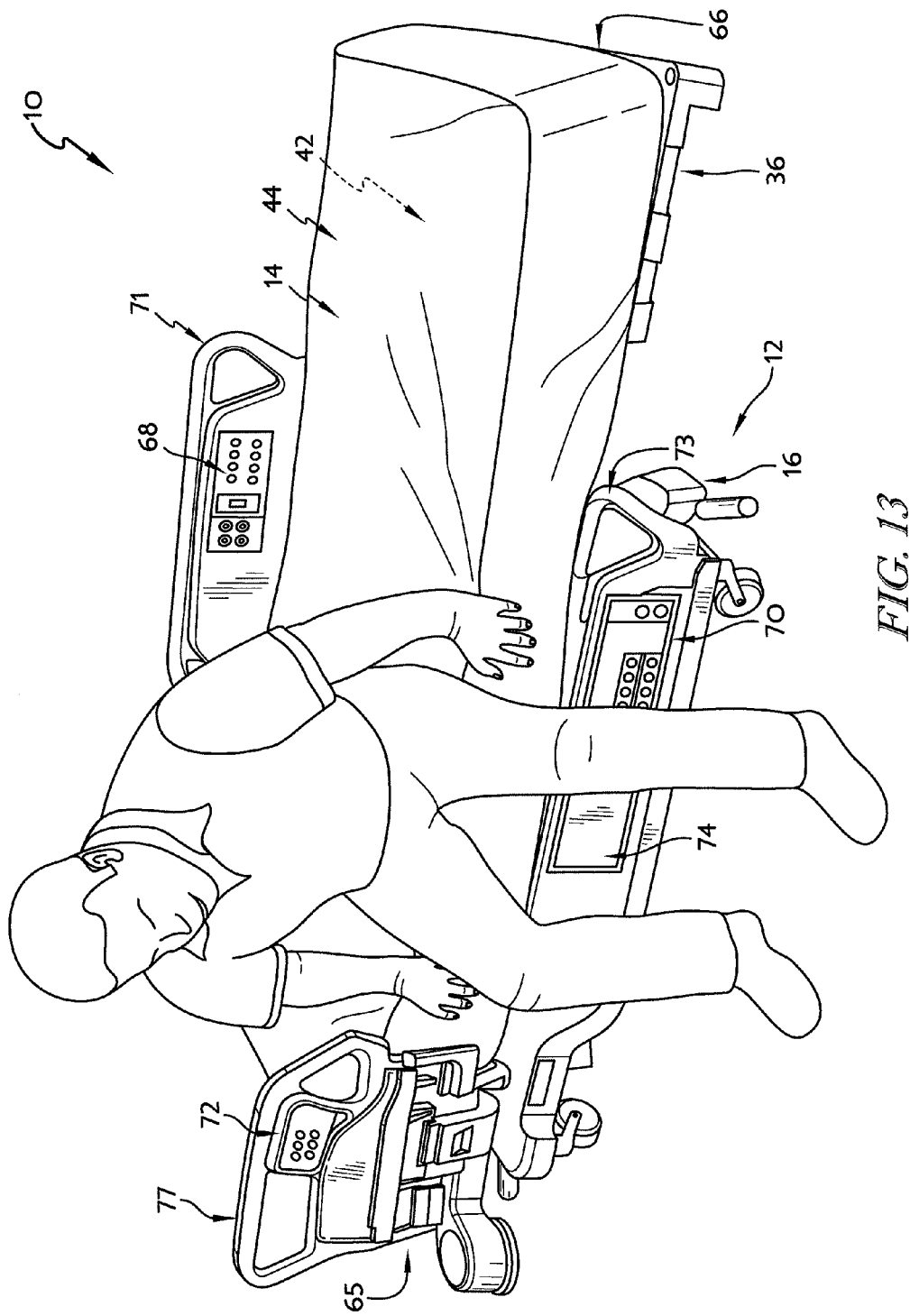
FIG. 13 is a perspective view of the patient support system moved to the side-egress configuration in response to a caregiver pressing and holding a side-egress button included in the second user interface panel (shown in FIG. 5) to reconfigure the patient support system with an upper frame of the patient support apparatus lowered and with a siderail of the patient support apparatus lowered to allow a patient to exit the patient support system along a side of the patient support system.
Figure 14:
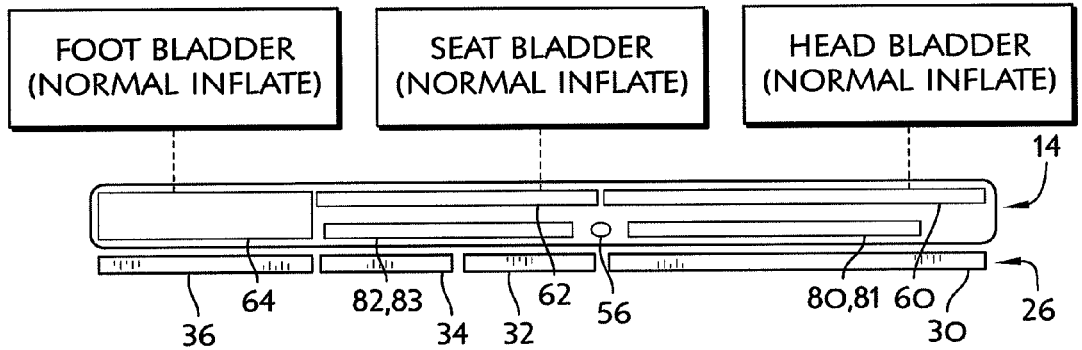
FIGS. 14-16 are a series of partially diagrammatic side elevation views of the deck and the support surface showing the deck of the patient support apparatus in the flat configuration and showing the support bladders of the support surface inflated to support a patient exiting the patient support system.

Referring now to FIG. 5, the second user interface 72 includes a plurality of buttons 117-124. Buttons 117-124 are operable by a caregiver to reconfigure the bed 10 by communicating with the controller to operate the deck 26, the lift system 20, the valve box 45, and the air supply 79. Specifically, the first user interface 70 includes the following buttons:

Side-egress button 117 for reconfiguring the bed 10 to a side-egress configuration as shown in FIG. 13, Return-to-rest button 118 for returning the bed 10 to a resting configuration from the side-egress configuration, Head-deck incline button 119 for increasing the incline of the head-deck section 30 by pivoting the head-deck section 30 relative to the seat-deck section 32 and sliding the head-deck section 30 relative to the seat-deck section 32 and the upper frame 18 as suggested in FIGS. 6-8, Head-deck decline button 120 for decreasing the incline of the head-deck section 30, Thigh-deck incline button 121 for increasing the incline of the thigh-deck section 34, Thigh-deck decline button 122 for decreasing the incline of the thigh-deck section 34, Upper-frame raise button 123 for lifting the upper frame 18 relative to the lower frame 16, and Upper-frame lower button 124 for lowering the upper frame 18 relative to the lower frame 16.

Turning now to FIGS. 6-8, the deck 26 of the patient support apparatus 12 is shown moving from a flat position (shown in FIG. 6) to a fully-inclined position (shown in FIG. 8) and showing that the fill bladder 56 of the support surface 14 is inflated to fill the gap G1 formed in the support surface 14 and the gap G2 created in the deck 26 during movement to the fully-inclined position. More particularly, when a caregiver presses one of the head-deck incline buttons 110, 119, the controller 25 operates the deck 26 so that the head-deck section 30 pivots and slides relative to the seat-deck section 32 to form in inclined angle with the seat-deck section 32. As the head-deck section 30 moves relative to the seat-deck section 32, the gap G2 expands as shown in FIGS. 7 and 8. As the gap G2 is formed between the head-deck section 30 and the seat-deck section 32, the gap G1 between the head-support bladders 60 and the seat-support bladders 62 is formed when the head-support bladders 60 move with the head-deck section 30 away from the seat-deck section 32.

The controller 25 is configured to inflate the fill bladder 56 to a level corresponding to the movement of the head-deck section 30 relative to the seat-deck section 32 as suggested in FIGS. 7 and 8. Specifically, when the head-deck section 30 is moved to a partially-inclined position (shown in FIG. 7), the controller 25 operates the air source 79 and the valve box 45 to inflate the fill bladder 56 to a partially inflated state. When the head-deck section 30 is moved to the fully-inclined position (shown in FIG. 8), the controller operates the air source 79 to inflate the fill bladder 56 to a fully inflated state. As a result of inflating the fill bladder 56 when the head-deck section 30 moves away from the seat-deck section 32, a patient is properly supported on the bed 10 even though the gap G2 is formed in the deck 26 under the patient.

In addition to the fill bladder 56 inflating, the folds 96 of the lower ticking 90 are expand during movement of the head-deck section 30 away from the seat-deck section 32. The expansion of the folds 96 between the head-end section 92 and the foot-end section 94 of the lower ticking 90 prevents tearing or over-stretching of the lower ticking 90 during movement of the deck 26.

Figure 11:
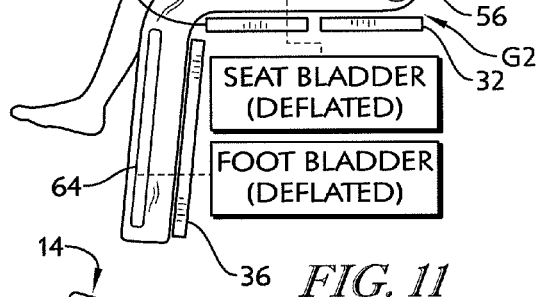
Figure 12:
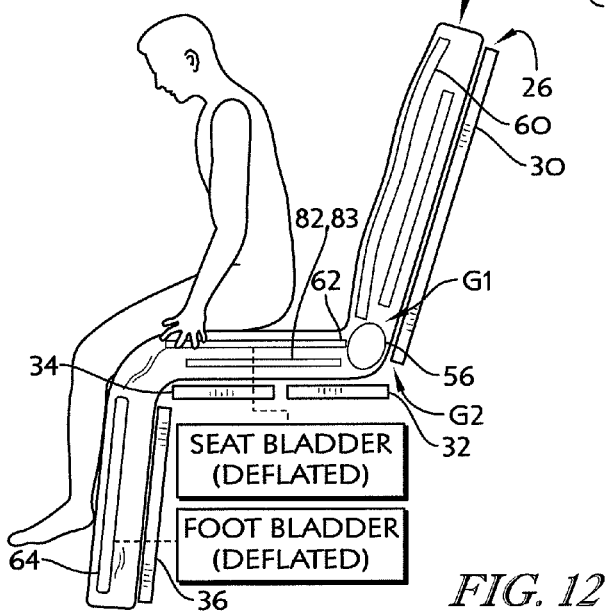

Referring now to FIG. 9, the bed 10 is shown moved to the chair-egress configuration. When a caregiver presses the chair-egress button 101, the controller 25 operates the lift system 20 to lower the upper frame 18. The controller 25 also operates the deck 26 to lower the foot-deck section 36 and raise the head-deck section 30 as shown in FIGS. 11-12.

Figure 10:
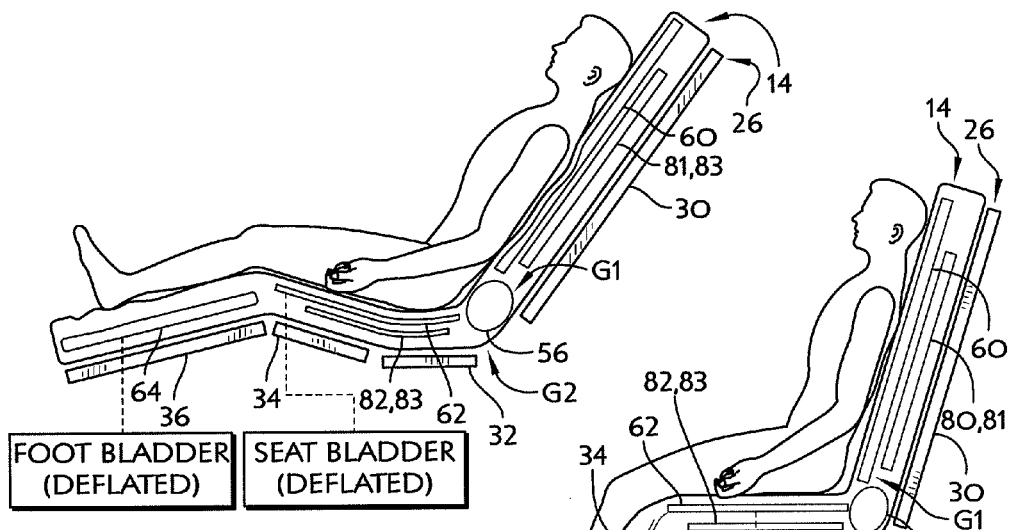
FIGS. 10-12 are a series of partially diagrammatic side elevation views of the deck and the support surface showing the deck of the patient support apparatus moving from the fully inclined position, shown in FIG. 10, to the chair-egress configuration, shown in FIG. 12, and showing that bladders in the support surface deflate and inflate during movement from the fully-inclined configuration to the chair-egress configuration.

In the illustrative embodiment, if a caregiver presses and holds the chair-egress button 101, the controller 25 is configured to determine if the footboard of the patient-support apparatus 12 has been removed. Then the controller operates the deck 26 to move the patient support apparatus 12 to a full chair configuration. Once the full chair position is reached, the controller 25 is configured to operate the valve box 45 to deflate the seat-support bladder 62 and the foot-support bladder 64 prior to moving the upper frame 18 and the deck 26 as suggested in FIG. 10. When the seat-support bladder 62 is deflated, the controller 25 is configured to lower the upper frame 18, lower the foot-deck section 36, and raise the head-deck section 30 to the chair-egress configuration as shown in FIG. 11.

Alternatively, the controller 25 coordinates movement of the deck 26 to the chair egress position with deflation of the seat-support bladder 62 and the foot-support bladder 64. More specifically, the controller 25 simultaneously moves the deck 26 toward the chair egress position while deflating the seat-support bladder 62 and the foot-support bladder 64. During movement of the deck 26 and deflation of the seat-support bladder 62 and the foot-support bladder 64, the controller 25 monitors progress of deflation via pressure sensors in the seat-support bladder 62 and the foot-support bladder 64. The controller 25 may slow or pause movement of the deck 26 if pressure in the seat-support bladder 62 and the foot-support bladder 64 are not at a predetermined level corresponding to the position of the deck 26 or if the pressure is not dropping at a predetermined rate. Further, the controller 25 may stop movement of the deck 26 and trigger an alarm to communicate an error or a fault to a caregiver if deflation of the seat-support bladder 62 and the foot-support bladder 64 is not progressing. Thus, the controller 26 prevents movement of the deck 26 to the chair egress position without full deflation of the seat-support bladder 62 and the foot-support bladder 64. Similarly, the controller 25 may coordinate movement of the deck 26 from the chair egress position to the flat position with inflation of the seat-support bladder 62 and the foot-support bladder 64.

As a result of deflating the seat-support bladder 62, a patient supported on the bed 10 is lowered and supported on the hard surface of the seat-deck section 32 and the thigh-deck section 34 when the chair-egress configuration is reached. Supporting the patient on the hard surfaces of the seat-deck section and the thigh-deck section 34 provides stability to the patient so that the patient can stand up out of the bed 10. Additionally, because the foot-support bladder 64 is deflated, the patient is able to place her feet on the floor adjacent to the foot-deck section 36 when exiting the bed 10 as suggested in FIG. 12.

When the chair-egress configuration is reached, the controller 25 is configured to operate the valve box 45 to inflate the head-turn rotation bladders 80, 81 to assist a patient exiting the bed 10 as suggested in FIG. 12. The head-turn rotation bladders 80, 81 to a push-pressure determined by the controller 25. The push-pressure a pressure based at least in part on the most recent patient weight determined by the controller 25.

Referring now to FIG. 13, the bed 10 is shown moved to the side-egress configuration. When a caregiver presses the side-egress button 117, the controller 25 operates the lift system 20 to lower the upper frame 18. The controller 25 also operates the deck 26 to flatten the deck 26 as shown in FIG. 13.

Figure 15:
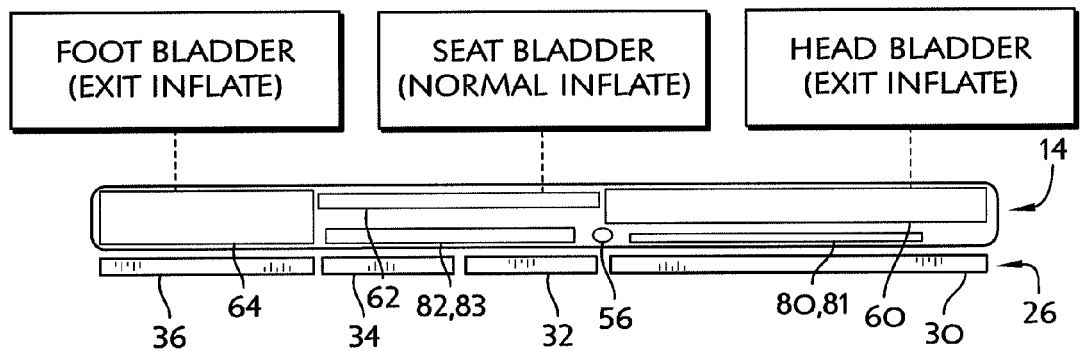
Figure 16:
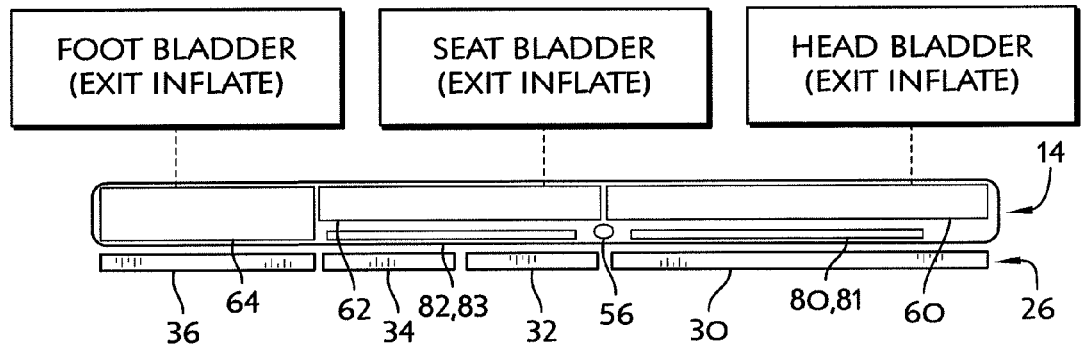

In the illustrative embodiment, if a caregiver presses and holds the side-egress button 117 after the bed 10 reaches the side-egress configuration, the controller 25 is configured to operate the valve box 45 and the air source 79 to inflate the head-support bladder 60 and the foot-support bladder 64 to an exit pressure as shown in FIG. 15. Additionally, the rotation bladders 52 are inflated to exit pressures. When the head-support bladder 60 and the foot-support bladder 64 are inflated, the controller 25 is configured to inflate the seat-support bladder 62 to an exit pressure to assist a patient exiting the bed 10 as suggested in FIG. 16. Exit pressures of the support bladders 60, 62, 64 are generally greater than normal operating pressures as further described below.

As a result of inflating the head-support bladder 60 and the foot-support bladder 64 to the exit pressures, a patient supported on the bed 10 able to push downwardly with his hands to push himself up out of the bed 10 as suggested in FIG. 13. Additionally, because the seat-support bladder 62 is inflated to an exit pressure, the patient is assisted in exiting the bed 10 as suggested in FIG. 13.

In the illustrative embodiment, the algorithm for determining the exit pressures of the head-support bladder 60, the seat-support bladder 62, and the foot support bladder 64 are dependent upon patient weight determined by the controller 25 based, at least in part, on information from the load cells sensors 78. The exit pressures are illustratively determined according to the following equations wherein PWSP=patient weight for setpoints in pounds. All pressures are determined in inches of water and are limited to 32 inches of water.

Head Exit Pressure=(15/400)*PWSP+14, up to 32

Seat Exit Pressure=(15/400)*PWSP+14, up to 32

Foot Exit Pressure=(15/400)*PWSP+14, up to 32

Rotation Exit Pressure=2

Figure 17:
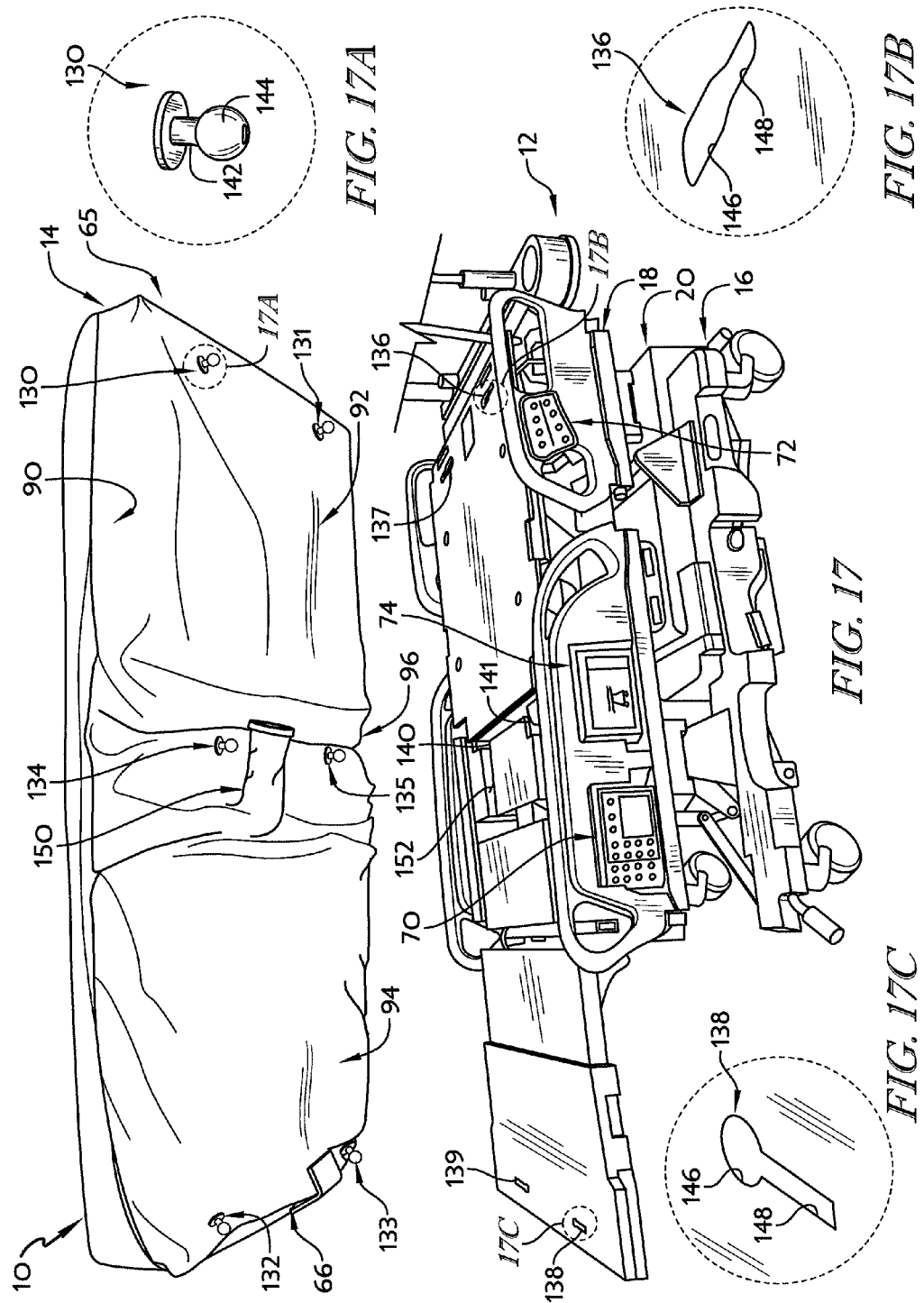
FIG. 17 is a perspective view of the patient support system of FIG. 1 showing the support surface lifted up off of the patient support apparatus to expose the deck of the patient support apparatus.
Figure 18:
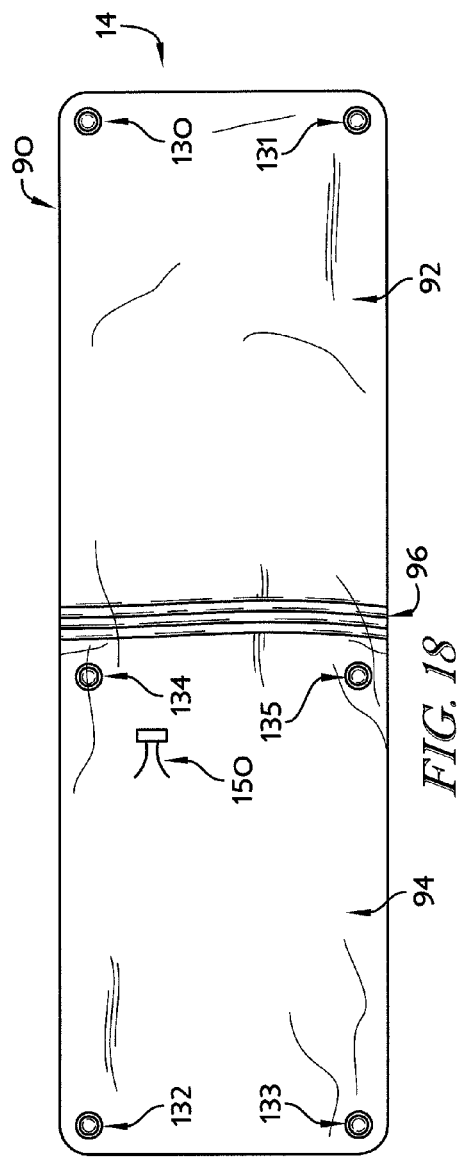
FIG. 18 is a bottom plan view of the support surface of FIGS. 1 and 17 showing the location of the lugs used to couple the support surface to the deck of the patient support apparatus.
Figure 19:
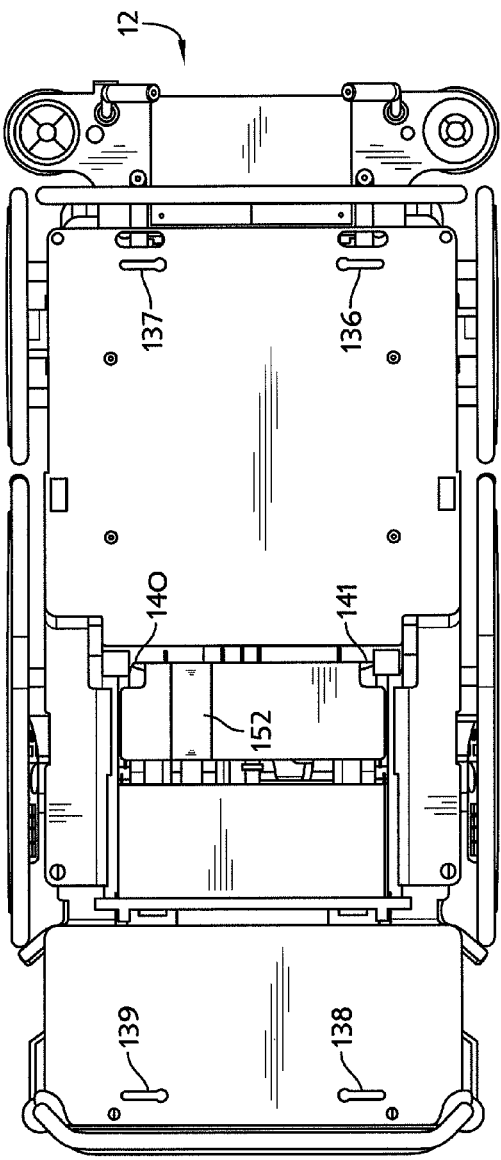
FIG. 19 is a top plan view of the patient support apparatus of FIGS. 1 and 17 showing the location of the lug apertures formed in the deck to receive the lugs used to couple the support surface to the patient support apparatus.

Referring now to FIGS. 17-19, the support surface 14 is coupled to the patient support apparatus 12 by a plurality of lugs 130-135 received in corresponding lug-receiver apertures 136-141. A first pair of lugs 130, 131 is coupled to the head-end section 92 of the lower ticking 90 along the head end 65 of the support surface 14. The first pair of lugs 130, 131 is received in a corresponding pair of keyhole slots 136, 137 formed in the head-deck section 30 of the deck 26 as suggested in FIGS. 17-19. A second pair of lugs 132, 133 is coupled to the foot-end section 94 of the lower ticking 90 along the foot end 66 of the support surface 14. The second pair of lugs 132, 133 are received in a corresponding pair of keyhole slots 138, 139 formed in the foot-deck section 36 of the deck 26 as suggested in FIGS. 17-19. A third pair of lugs 134, 135 is coupled to the ticking 90 between the head end 65 and the foot end 66 of the support surface 14. The third pair of lugs 130, 131 is received in a corresponding pair of notches 140, 141 formed in the seat-deck section 32 of the deck 26 as suggested in FIGS. 17-19.

As suggested in FIG. 17A, each lug includes a stem 142 and a ball 144 coupled to the stem and spaced apart from the lower ticking 90. The stems 142 extend through the deck 26 and the balls 144 are trapped below the deck 26 by the lug-receiver apertures 136-141 when the support surface 14 is mounted on the patient support apparatus 12.

In the illustrative embodiment, the keyhole slots 136, 137, 138, 139 have a wide portion 146 and a narrow portion 148 as shown in FIGS. 17B and 17C. The wide portions 146 are illustratively located inwardly of the narrow portions 148 as shown in FIG. 19.

Referring again to FIGS. 17-19, the support surface 14 includes a trunk 150 extending downwardly from the foot-end section 94 of the lower ticking 90 as shown in FIG. 17. The seat-deck section 32 is formed to include a channel 152 extending downwardly toward the floor underlying the bed 10 and arranged to receive the trunk 150 of the support surface 14 as suggested in FIGS. 17-19. The trunk 150 includes air lines and communication lines for coupling the controller 25 and the air source 79 to the support surface 14 as shown in FIG. 2.

Figure 20:
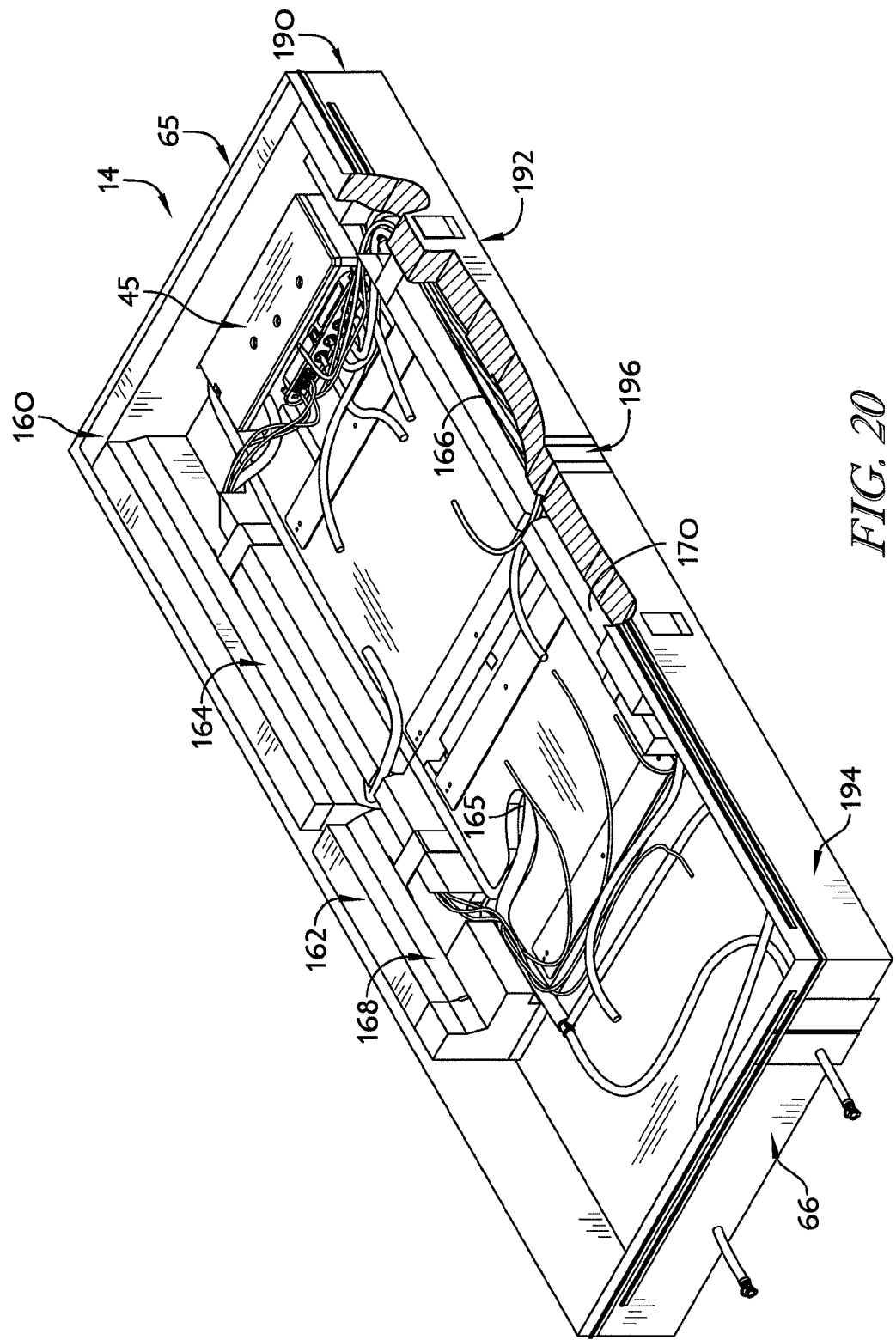
FIG. 20 is a perspective view of the support surface of FIG. 1 showing components removed to expose the foam shell and to show that the foam shell includes a head portion formed to include line routing channels and a seat portion formed to include an entry port.

Turning now to FIG. 20, the support surface 14 is shown with the topper 86, the fire barrier 88, and the bladders 42 removed to expose the foam shell 40 and valve box 45 inside the lower ticking 90. The foam shell 40 illustratively includes a head shell 160 and a seat shell 162 as shown in FIGS. 3 and 20. The head shell 160 is formed to include a left channel 164 and a right channel 166 arranged to extend along the sides of the support surface 14 to provide a path for air and communication lines to pass from the valve box 45 along the interior of the support surface 14. The seat shell 162 is formed to include a line aperture 165 extending through the seat shell 162 to allow air and communication lines inside the support surface 14 to be connected with the trunk 150 of the support surface 14. Additionally, the seat shell 162 is formed to include a left channel 168 and a right channel 170 arranged to extend along the sides of the support surface 14 to provide a path for air and communication lines to pass from the line aperture 165 along the interior of the support surface 14 toward the head end 65 and the foot end 66 of the support surface 14.

Figure 21:
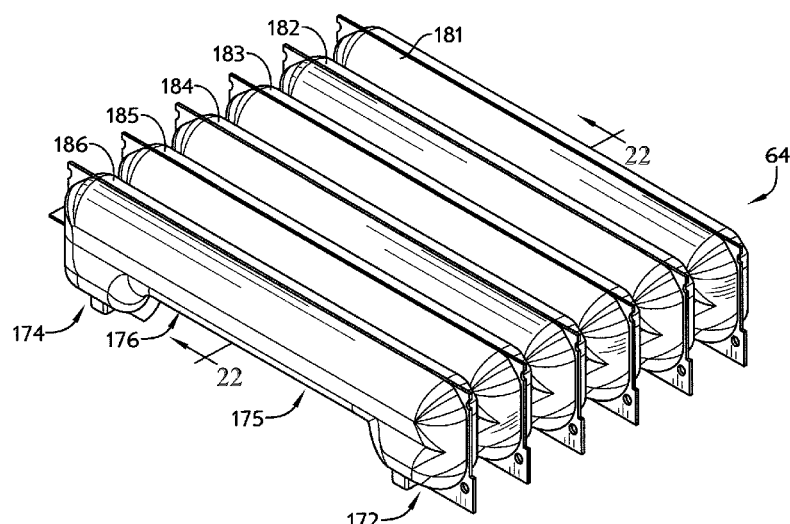
FIG. 21 is an enlarged perspective view of the foot bladder included in the support surface of FIGS. 1-3 showing that the foot bladder has a reduced thickness central section configured to conform to a patient's heel in response to a patient's foot resting on the foot bladder.
Figure 22:
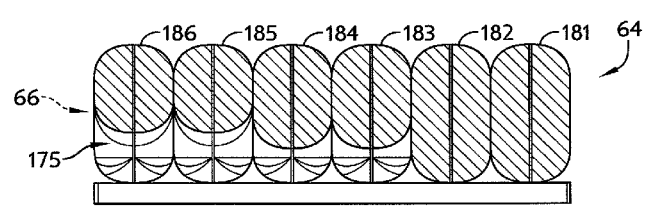
FIG. 22 is a cross-sectional view of the foot bladder in FIG. 21 taken at line 22-22 showing that the central section of the foot bladder has a gradually diminishing thickness while outer sections of the foot bladder have an equal thickness along the length of the foot bladder.

Referring now to FIGS. 21 and 22, the foot-support bladder 64 illustratively includes a plurality of cells 181, 182, 183, 184, 185, 186 that cooperate to form a left rail section 172, a right rail section 174, and a central section 176. The left and the right rail sections 172, 174 of the foot-support bladder 64 have a substantially similar cross-sectional area as shown in FIGS. 21, 22. However, the central section 176 has a diminishing cross-sectional area moving toward the foot end 66 of the support surface 14 as suggested in FIGS. 21 and 22. The result of the diminishing cross-sectional area is the formation of a space 175 formed under a portion of the central section 176 that allows for bucking of the foot-support bladder 64 when a patient's heel is supported on the central section 176. Buckling of the cells 181-186 adds the surface area of the foot-support bladder 64 in contact with the heel and foot of a patient. Therefore, the local pressure on the skin is reduced as the patient's feet are partially immersed in the foot-support bladder 64.

Referring back to FIG. 1, the patient support apparatus 12 includes siderails 71, 73 coupled to the seat-deck section 32 and headrails 75, 77 coupled to the head-deck section 30. The patient support apparatus 12 also includes a headboard 19 coupled to the upper frame 18 and a removable footboard 37 coupled to the foot-deck section 36. The controller 25 is configured to move the bed 10 to the chair-egress configuration only if the footboard 37 is removed from the foot-deck section 36. If the footboard 37 is not removed and a user requests the chair-egress position, an instructional screen appears on the user interface 74 suggesting that the caregiver remove the footboard 37.

The user interface 68 is a push-button panel coupled to an inner side of the siderail 71 included in the patient support apparatus 12. The user interface 70 is a push-button panel pivotably coupled to an outer side of the siderail 73 included in the patient support apparatus 12. The user interface 72 is a push-button panel coupled to an outer side of the headrail 77. The user interface 74 is a touch screen graphical user interface coupled to the outer side of the side rail 73.

Figure 23:
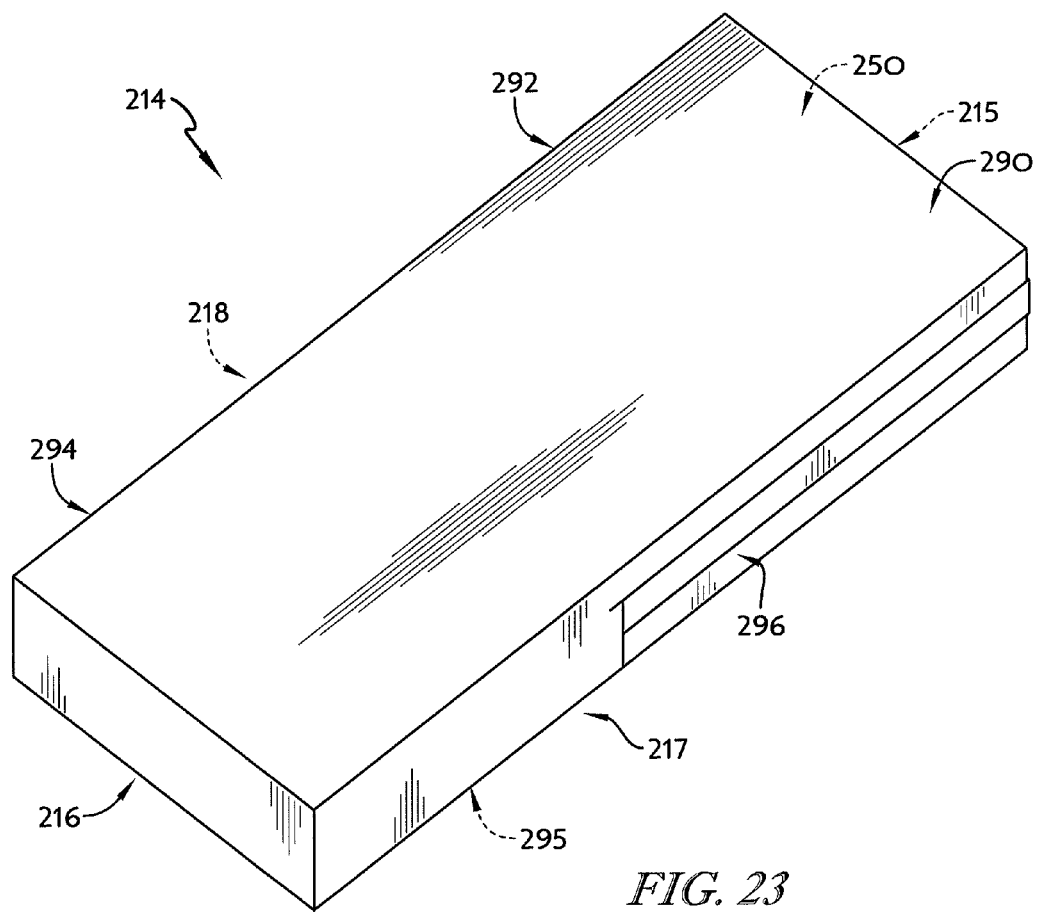
FIG. 23 is a perspective view of a second support surface configured for use with the patient support apparatus of FIG. 1.
Figure 24:
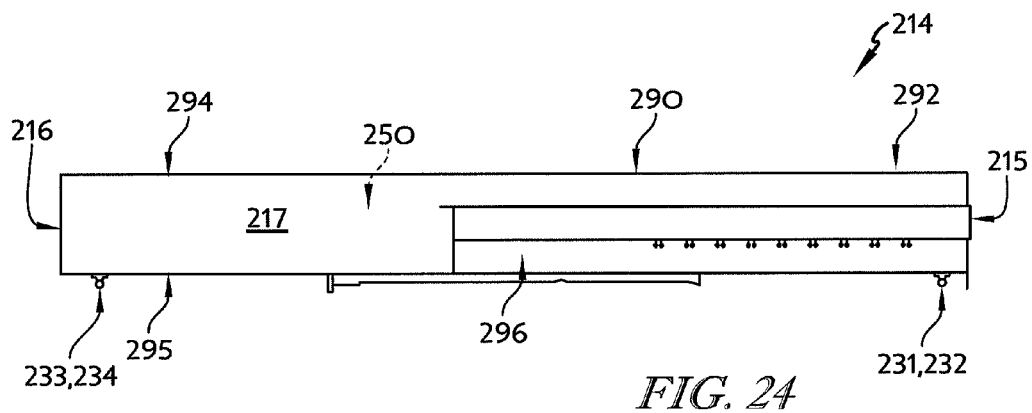
FIG. 24 is a side elevation view of the second support surface shown in FIG. 23.
Figure 25:
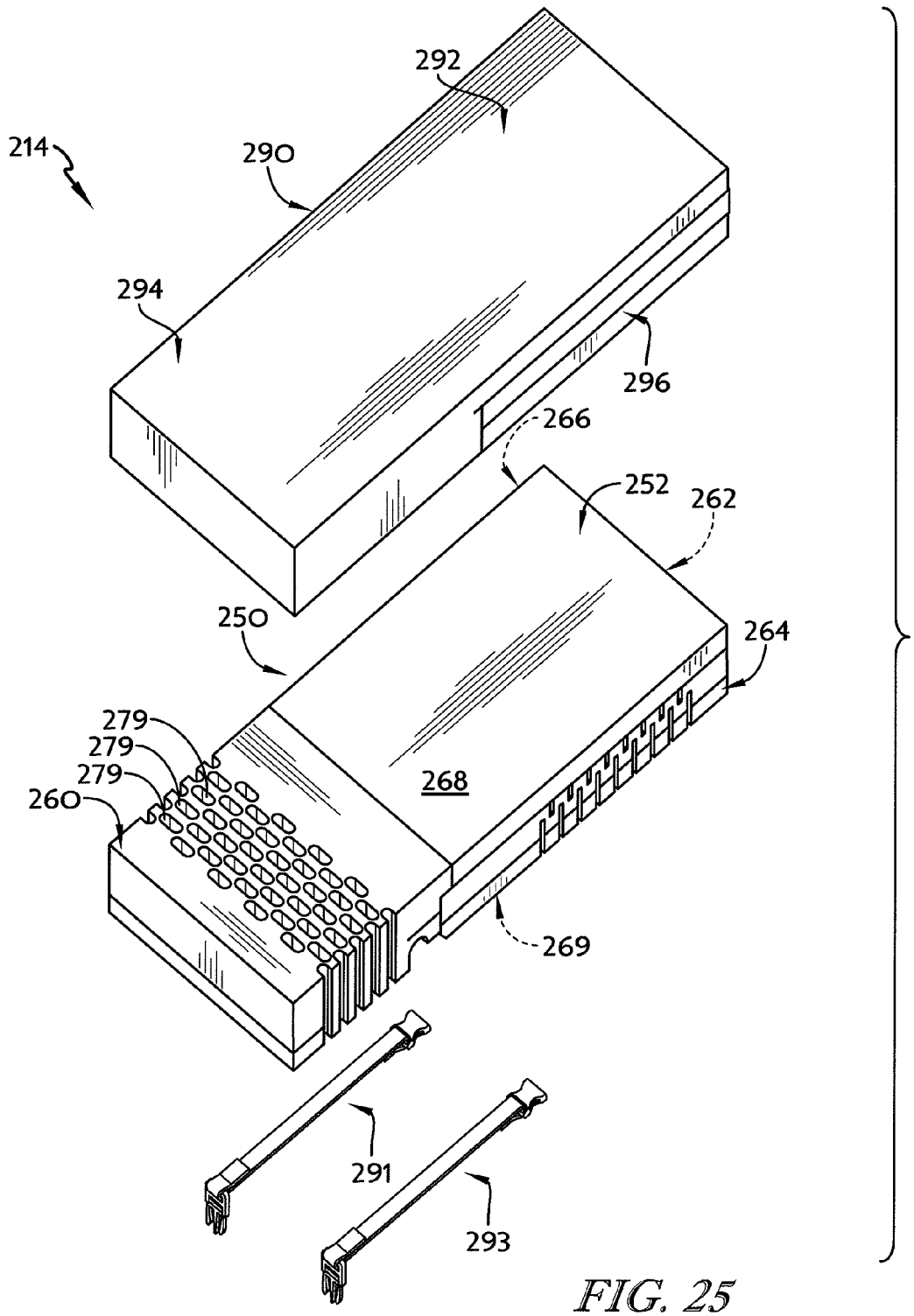
FIG. 25 is a perspective view of the second support surface of FIGS. 23 and 24 showing that the second support surface includes an outer ticking, an interior cushion, and a pair of frame straps.

Turning now to FIG. 23, an alternative support surface 214 for use with the patient support apparatus 12 is shown. The support surface 214 has a head end 215, a foot end 216, a left side 217 and a right side 218 as shown in FIGS. 23 and 24. The support surface 214 illustratively includes an outer ticking 290, an interior cushion 250, and a pair of frame straps 291, 293 as shown in FIG. 25. The outer ticking 290 encases the interior cushion 250 as shown in FIG. 24. The interior cushion 250 supports a patient lying on the support surface 214. Both the outer ticking 290 and the interior cushion 250 are configured to accommodate movement of the deck 26 from the flat position (shown in FIG. 6) to the fully-inclined position (shown in FIG. 8) without including an inflatable fill bladder.

The outer ticking 290 illustratively includes a head-end section 292, a foot-end section 294, and an elastic section 296 coupled to the head-end section 292 and the foot-end section 294 as shown in FIGS. 23-25. The elastic section 296 is configured to allow expansion of a bottom side 295 of the support surface 214 to accommodate formation of the gap G2 between the deck sections 30, 32 when the deck 26 of the patient support apparatus 12 is repositioned as suggested in FIGS. 6-8. In some embodiments, the outer ticking 290 may include a plurality of expandable folds similar to the expandable folds 96 described herein in place of the elastic section 296.

Figure 26:
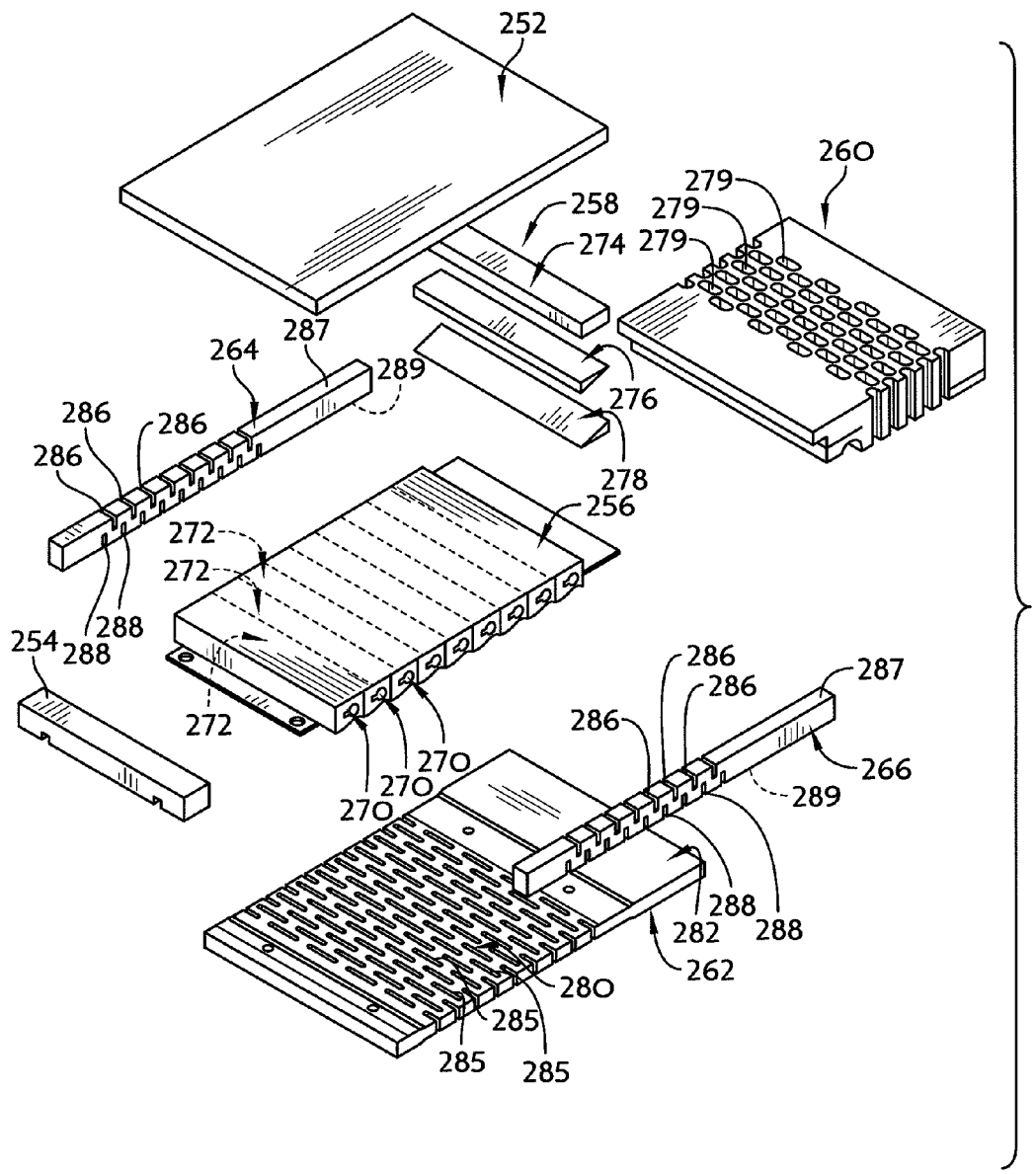
FIG. 26 is an exploded perspective view of the interior cushion of FIG. 25.

Turning now to FIG. 26, the interior cushion 250 illustratively includes a top pad 252, a head pad 254, an air pad 256, a knee joint pad assembly 258, a foot pad 260, an expandable bottom pad 262, and a pair of side bolsters 264, 266. The top pad 252, the head pad 254, the knee joint pad assembly 258, the foot pad 260, the expandable bottom pad 262, and the side bolsters 264, 266 are made from foam. The air pad 256 includes a plurality of sealed air cells 270 each containing a foam pad 272.

The top pad 252 forms a portion of a top surface 268 of the cushion 250 and is arranged to extend from the head end 215 of the surface 214 toward the foot end 216 of the patient support surface 214 as shown in FIGS. 25 and 26. The head pad 254 underlies the top pad 252 and is arranged to extend from the head end 215 of the patient support surface 214 toward the foot end 216 of the surface 214. The air pad 256 underlies the top pad 252 and extends from the head pad 254 toward the foot end 216 of the surface 214. The knee joint pad assembly 258 also underlies the top pad 252 and a portion of the foot pad 260. The knee joint pad assembly 258 extends between the air pad 256 and the foot pad 260.

The expandable bottom pad 262 forms a portion of a bottom surface 269 of the cushion 250 and underlies the top pad 252, the head pad 254, the air pad 256, the knee joint pad assembly 258, a portion of the foot pad 260 and the side bolsters 264, 266 as shown in FIGS. 25 and 26. The expandable bottom pad 262 extends from the head end 215 of the surface 214 toward the foot end 216 of the surface 214. The side bolsters 264, 266 underlie the top pad 252 and a portion of the foot pad 260. The side bolsters 264, 266 further extend from the head end 215 of the surface 214 toward the foot end 216 of the surface 214 along the left and right sides 217, 218, respectively, of the surface 214.

The knee-joint pad assembly 258 illustratively includes a knee block 274, a first knee wedge 276, and a second knee wedge 278 as shown in FIG. 26. The knee wedges 276, 278 underlie the knee block 274 and cooperate to provide a joint between the air pad 256 and the foot pad 260 to facilitate bending of the surface 214 when the foot deck section 36 pivots relative to the thigh deck section 34 of the deck 26 as suggested in FIG. 1.

The foot pad 260 forms a portion of the top and bottom surfaces 268, 269 of the cushion 250 as shown in FIGS. 25 and 26. The foot pad 260 is formed to include a plurality of perforations 279 extending from the top surface 268 to the bottom surface 269 of the cushion 250. The perforations 279 expand to allow extension of the foot pad 260 when the foot deck section 36 is extended and to allow retraction of the foot pad 260 when the foot deck section 36 is retracted. The perforations 279 may also reduce interface pressure between a patient's feet and the surface 214 to reduce the risk of pressure ulcer formation on the patient's feet.

The expandable bottom pad 262 includes a perforated portion 280 and a solid portion 282 as shown in FIG. 26. The perforated portion 280 extends from the head end 215 of the surface 214 toward the foot end 216 of the surface 214 to overlie the head deck section 30 of the deck 26 when the surface 214 is mounted on the patient support apparatus 12. The solid portion 282 extends from the perforated portion 280 toward the foot end 216 of the surface 214 to overlie the seat deck section 32 of the deck 26.

The perforated portion 280 of the expandable bottom pad 262 is formed to include a plurality of perforations 285 as shown in FIG. 26. The perforations 285 extend through the expandable bottom pad 262 from the bottom surface 269 of the cushion 250 toward the top surface 268 of the cushion 250. The perforations 285 expand during movement of the deck 26 from the flat position (shown in FIG. 6) to the fully-inclined position (shown in FIG. 8) so that the gap G2 formed between the head deck section 30 and the seat deck section 32 is covered. Thus, the surface 214 is prevented from buckling or bunching into the gap G2 when the head deck section 30 moves away from the seat deck section 32.

Each of the side bolsters 264, 266 is formed to include a plurality of top-side slits 286 and bottom-side slits 288 as shown in FIG. 26. The top-side slits 286 extend from a top side 287 of the bolsters 264, 266 toward a bottom side 269 of the bolsters 264, 266. The bottom-side slits 288 extend from the bottom side 269 toward the top side 267 of the bolsters 264, 266. In operation, the top-side slits 286 and the bottom-side slits 288 expand during movement of the deck 26 from the flat position to the fully-inclined position.

The patient support surface 214 also includes a plurality of lugs 231-234 configured to be received in corresponding lug-receiver apertures 136-139 included in the deck 26 of the patient support apparatus 12. A first pair of lugs 231, 232 is coupled to the head-end section 292 of the ticking 290 and to the expandable bottom pad 262 of the cushion 250 along the head end 215 of the support surface 214. The first pair of lugs 231, 232 is configured to be received in the corresponding pair of keyhole slots 136, 137 formed in the head-deck section 30 of the deck 26 shown in FIG. 17. A second pair of lugs 233, 234 is coupled to the foot-end section 294 of the ticking 290 and to the foot pad 260 along the foot end 216 of the support surface 214. The second pair of lugs 233, 234 are received in the corresponding pair of keyhole slots 138, 139 formed in the foot-deck section 36 of the deck 26 shown in FIG. 17.

Figure 27:
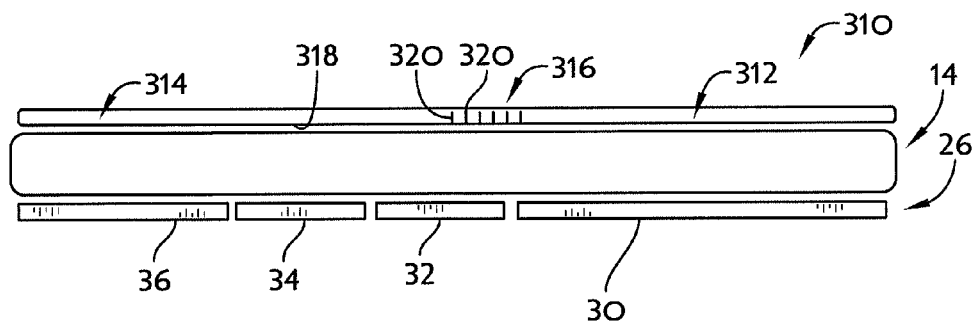
FIG. 27 is a view similar to FIG. 6 showing an optional overlay adapted for use with the patient support system of FIGS. 1-22.
Figure 28:
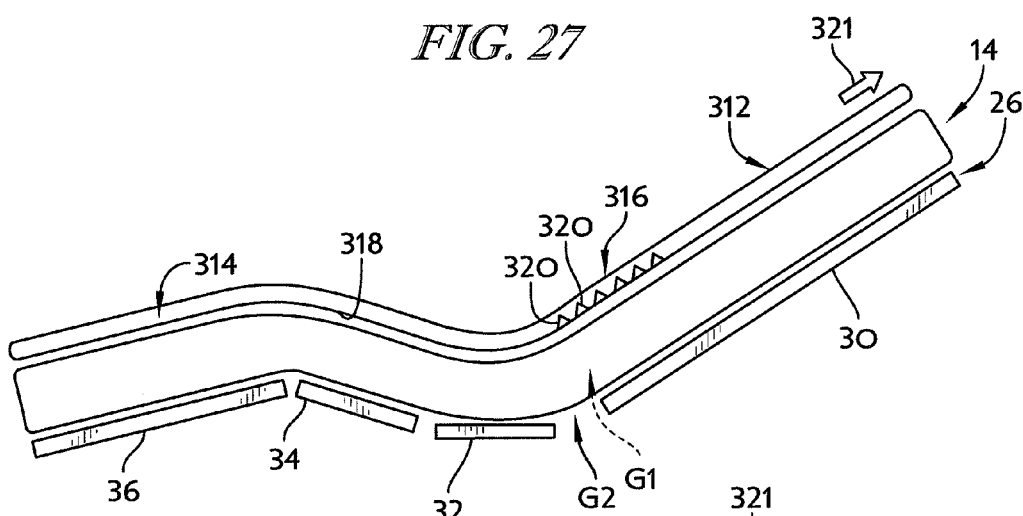
FIG. 28 is a view similar to FIG. 7 with the overlay of FIG. 27 mounted to the patient support system of FIGS. 1-22.
Figure 29:
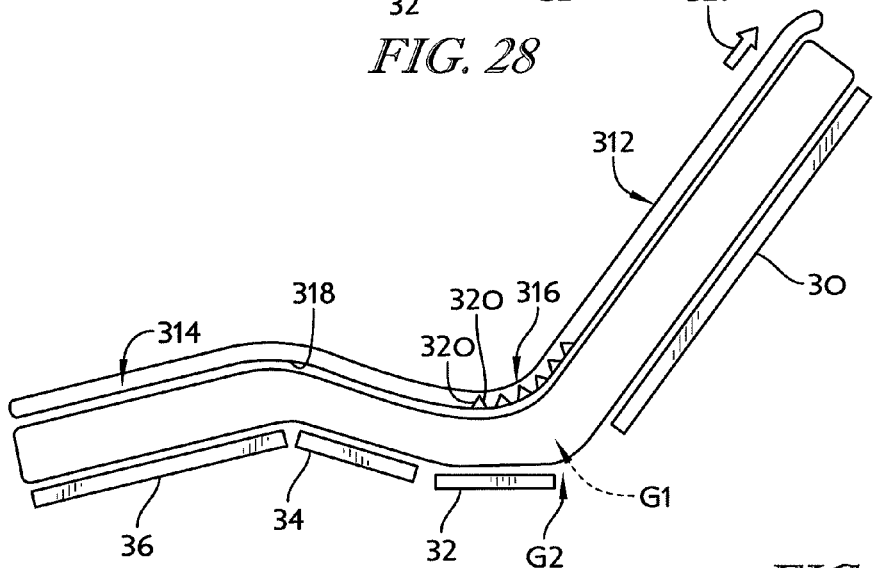
FIG. 29 is a view similar to FIG. 8 with the overlay of FIGS. 27 and 28 mounted to the patient support system of FIGS. 1-22.

Turning now to FIGS. 27-29, an overlay 310 adapted for use with the patient support system 10 is shown. The overlay 310 illustratively includes a head portion 312, a foot portion 314, and an expandable portion 316 arranged between the head portion 312 and the foot portion 314. The overlay 310 also has a low-friction underside 318 that engages the top side of the patient support surface 14. In the illustrative embodiment, the expandable portion 316 includes a plurality of expandable folds 320 but in other embodiments may be an elastic material.

In operation, the expandable portion 316 of the overlay 310 expands during movement of the deck 26 from the flat position (shown in FIG. 27) to the fully-inclined position (shown in FIG. 29). Thus, the overlay 310 operates to further support a patient over the gaps G1 and gap G2 formed in the deck 26 and the surface 14. Further, the low-friction surface 318 of the overlay 310 is allowed to slide slightly relative to the surface 14 as suggested by arrow 321 thereby relieving additional shear stresses that might be applied to a patient's skin during movement from the flat position to the fully-inclined position.

Although certain illustrative embodiments have been described in detail above, variations and modifications exist within the scope and spirit of this disclosure as described and as defined in the following claims.

The invention claimed is:

1. A patient support system comprising
   a patient support apparatus including a seat-deck section and a head-deck section movable relative to the seat-deck section between a first position adjacent the seat-deck section and a second position spaced apart from the seat-deck section forming a gap between the seat-deck section and the head-deck section,
   a support surface including a cover, a plurality of support bladders, and a fill bladder arranged over an interface of the seat-deck section and the head-deck section,
   an air source coupled to the fill bladder, and
   a controller coupled to the air source, the controller configured to inflate the fill bladder in response to movement of the head-deck section from the first position to the second position so that the fill bladder covers the gap formed between the seat-deck section and the head-deck section,
   wherein the support surface includes a trunk carrying pneumatic and electrical lines that extends downwardly from a bottom surface of the cover to be received by the patient support apparatus when the support surface is mounted on the patient support apparatus, and the seat-deck section is formed to include a channel sized to receive the trunk of the support surface when the support surface is mounted on the patient support apparatus.

2. The patient support system of claim 1, wherein the cover includes a head-end section, a foot-end section, and expandable folds coupled between the head-end section and the foot-end, the expandable folds arranged over the interface of the seat-deck section and the head-deck section so that the cover extends over the gap formed between the seat-deck section and the head-deck section when the head-deck section is moved from the first position to the second position.

3. The patient support system of claim 1, wherein the support surface includes a plurality of lugs coupled to a bottom side of the cover configured to be received in lug-receiving apertures formed in the moveable deck when the support surface is mounted on the patient support apparatus.

4. The patient support system of claim 3, wherein the lugs include a stem and a ball, the ball spaced apart from the cover.

5. The patient support system of 4, wherein the lug-receiving apertures include at least one keyhole slot with a wide portion and a narrow portion.

6. The patient support system of claim 1, wherein the patient support apparatus includes a foot-deck section, and the plurality of support bladders includes a head-support bladder arranged to extend over the head-deck section, a seat-support bladder arranged to extend over the seat-deck section, and a foot support bladder arranged to extend over the foot-deck section.

7. A patient support system comprising
   a patient support apparatus including a seat-deck section and a head-deck section movable relative to the seat-deck section between a first position adjacent the seat-deck section and a second position spaced apart from the seat-deck section forming a gap between the seat-deck section and the head-deck section,
   a support surface including a plurality of support bladders and a fill bladder arranged over the interface of the seat-deck section and the head-deck section,
   an air source coupled to the fill bladder, and
   a controller coupled to the air source, the controller configured to inflate the fill bladder in response to movement of the head-deck section from the first position to the second position so that the fill bladder covers the gap formed between the seat-deck section and the head-deck section,
   wherein the patient support apparatus includes a foot-deck section, and the plurality of support bladders includes a head-support bladder arranged to extend over the head-deck section, a seat-support bladder arranged to extend over the seat-deck section, and a foot support bladder arranged to extend over the foot-deck section, and the foot-support bladder includes a plurality of cells that cooperate to form a left rail section a right rail section and a central section, the central section having a diminishing cross-sectional area to form a space under the central section defined between the left rail section, the right rail section, and the central section.

8. The patient support apparatus of claim 7, wherein the support surface includes a trunk extending downwardly from the cover, a pneumatic line extending from the trunk to at least one of the support bladders, and a foam member encased in the cover and formed to include an aperture, wherein the pneumatic line extends through the aperture, and the foam member includes a foam seat shell arranged to overlie the trunk and a foam head shell that is movable relative to the foam seat shell to a position spaced apart from the seat shell.

9. A patient support surface comprising
   a cover with a head end, a foot end, a left side, and a right side,
   a head-support bladder encased in the cover and extending from the head end of the cover toward the foot end of the cover,
   a seat-support bladder encased in the cover and extending from the head-support bladder toward the foot end of the cover,
   a foot-support bladder extending from the foot end of the cover toward the head end of the cover, the foot-support bladder forming a left rail section a right rail section and a central section, the central section shaped to form a space under the central section defined between the left rail section and the right rail section, and
   a fill bladder encased in the cover and arranged to underlie the interface of the head-support bladder and the seat-support bladder, and wherein the foot-support bladder includes a plurality of cells that cooperate to form the left rail section, the right rail section, and the central section, and wherein the central section of the foot support bladder has a diminishing cross section.

10. The patient support surface of claim 9, wherein the head-support bladder is movable from a first position spaced a first distance from the seat-support bladder to a second position spaced a second distance, greater than the first distance, from the seat-support bladder forming a gap between the head-support bladder and the seat-support bladder.

11. The patient support surface of claim 10, wherein the fill bladder is sized to fill the gap formed between the head-support bladder and the seat-support bladder when the head-support bladder is moved to the second position.

12. The patient support surface of claim 11, wherein the fill bladder extends from the left side to the right side of the cover.

13. The patient support surface of claim 9, wherein the cover includes a head-end section forming the head end of the cover, a foot-end section forming the foot end of the cover, and an expandable section arranged between the head-end section and the foot-end section.

14. The patient support surface of claim 13, wherein the expandable section includes a plurality of expandable folds arranged to underlie the interface of the head-support bladder and the seat-support bladder.

15. The patient support surface of claim 9, further comprising a plurality of lugs extending downwardly from the cover, each lug including a stem extending from the cover and a ball spaced apart from the cover.

16. A patient support surface comprising
a cover having a head end, a foot end, a left side, and a right side, the cover including a lower ticking and a trunk extending downwardly from the lower ticking,
an inflatable bladder encased in the cover,
a pneumatic line extending from the trunk to the inflatable bladder, and
a foam member encased in the cover and formed to include an aperture, wherein the pneumatic line extends through the aperture, and the foam member includes a foam seat shell arranged to overlie the trunk and a foam head shell that is movable relative to the foam seat shell to a position spaced apart from the seat shell.

17. The patient support surface of claim 16, wherein the trunk is spaced apart from the head end, the foot end, the left side, and the right side of the cover.

18. The patient support surface of claim 16, further comprising a foot support bladder arranged within the foot end of the cover, wherein the foot-support bladder includes a plurality of cells that cooperate to form a left rail section a right rail section and a central section, the central section having a diminishing cross-sectional area to form a space under the central section defined between the left rail section, the right rail section, and the central section.

* * * * *